United States Patent
Allen

(10) Patent No.: US 11,185,853 B2
(45) Date of Patent: Nov. 30, 2021

(54) CATALYSTS FOR POLYCARBONATE PRODUCTION

(71) Applicant: Saudi Aramco Technologies Company, Dhahran (SA)

(72) Inventor: Scott D. Allen, Ithaca, NY (US)

(73) Assignee: Saudi Aramco Technologies Company, Dhahran (SA)

( * ) Notice: Subject to any disclaimer, the term of this patent is extended or adjusted under 35 U.S.C. 154(b) by 130 days.

(21) Appl. No.: 16/227,396

(22) Filed: Dec. 20, 2018

(65) Prior Publication Data

US 2019/0193062 A1    Jun. 27, 2019

Related U.S. Application Data

(60) Provisional application No. 62/609,649, filed on Dec. 22, 2017.

(51) Int. Cl.
| | | |
|---|---|---|
| *C07D 317/44* | (2006.01) | |
| *B01J 31/22* | (2006.01) | |
| *C08G 64/34* | (2006.01) | |

(52) U.S. Cl.
CPC ....... *B01J 31/2217* (2013.01); *B01J 31/2243* (2013.01); *C08G 64/34* (2013.01); *B01J 2231/14* (2013.01); *B01J 2531/0238* (2013.01); *B01J 2531/0241* (2013.01); *B01J 2531/0297* (2013.01); *B01J 2531/31* (2013.01); *B01J 2531/842* (2013.01); *B01J 2531/845* (2013.01); *B01J 2540/44* (2013.01); *B01J 2540/448* (2013.01); *B01J 2540/62* (2013.01)

(58) Field of Classification Search
None
See application file for complete search history.

(56) References Cited

U.S. PATENT DOCUMENTS

| | | |
|---|---|---|
| 8,247,520 B2 | 8/2012 | Allen et al. |
| 8,470,956 B2 | 6/2013 | Allen et al. |
| 8,536,360 B2 | 9/2013 | Kim et al. |
| 8,604,155 B2 | 12/2013 | Allen et al. |
| 8,633,123 B2 | 1/2014 | Allen et al. |
| 8,921,508 B2 | 12/2014 | Allen et al. |
| 8,946,109 B2 | 2/2015 | Allen et al. |
| 8,951,930 B2 | 2/2015 | Allen et al. |
| 8,956,989 B2 | 2/2015 | Allen et al. |
| 9,327,280 B2 | 5/2016 | Lee et al. |
| 9,376,531 B2 | 6/2016 | Allen et al. |
| 9,505,878 B2 | 11/2016 | Allen et al. |
| 9,593,203 B2 | 3/2017 | Allen et al. |
| 9,771,388 B2 | 9/2017 | Job et al. |
| 9,809,678 B2 | 11/2017 | Allen et al. |
| 9,951,096 B2 | 4/2018 | Allen et al. |
| 10,301,426 B2 | 5/2019 | Allen et al. |
| 10,662,211 B2 | 5/2020 | Allen et al. |
| 2017/0052131 A1 | 2/2017 | Kim et al. |
| 2017/0081302 A1 | 3/2017 | Kim et al. |

FOREIGN PATENT DOCUMENTS

| | | |
|---|---|---|
| WO | WO-2009/148889 A2 | 12/2009 |
| WO | WO-2010/022388 A2 | 2/2010 |
| WO | WO-2010/028362 A1 | 3/2010 |
| WO | WO-2010/033703 A1 | 3/2010 |
| WO | WO-2010/033705 A1 | 3/2010 |
| WO | WO-2011/079041 A1 | 6/2011 |
| WO | WO-2012/027725 A1 | 3/2012 |
| WO | WO-2012/037282 A2 | 3/2012 |
| WO | WO-2012/040454 A2 | 3/2012 |
| WO | WO-2013/012895 A1 | 1/2013 |
| WO | WO-2013/022932 A1 | 2/2013 |
| WO | WO-2013/055747 A1 | 4/2013 |
| WO | WO-2013/067460 A1 | 5/2013 |
| WO | WO-2013/090276 A1 | 6/2013 |
| WO | WO-2013/096602 A1 | 6/2013 |
| WO | WO-2013/177546 A2 | 11/2013 |
| WO | WO-2014/031811 A1 | 2/2014 |
| WO | WO-2019/126221 A1 | 6/2019 |

OTHER PUBLICATIONS

Kim et al. Catalysis Science & Technology, 2017, 7, 4375-4387 (Year: 2017).*
International Search Report for PCT/US2018/066307, 5 pages (dated Mar. 25, 2019).
Sinha, I. et al., Computer-aided rational design of Fe(III)-catalysts for the selective formation of cyclic carbonates from CO2 and internal epoxides, Catal. Sci. Technol., 7: 4375-4387 (2013).
Written Opinion for PCT/US2018/066307, 7 pages (dated Mar. 25, 2019).
Fujita, M. et al., Quasi-Planar Homopolymetallic and Heteropolymetallic Coordination Arrays. Surface-Like Molecular Clusters of Magnesium and Aluminum, J. Am. Chem. Soc., 131: 4568-4569 (2009).
KAIST Develops a New Analysis Technique for Chiral Activity in Molecules, 1 page (retrieved Jul. 20, 2017). URL: http://chem.kaist.ac.kr/intro/menu5.php?is_convert=n.

* cited by examiner

*Primary Examiner* — Yun Qian
(74) *Attorney, Agent, or Firm* — Charles E. Lyon; John P. Rearick; Michael A. Shinall

(57) ABSTRACT

The present invention provides unimolecular metal complexes having increased activity in the copolymerization of carbon dioxide and epoxides. Also provided are methods of using such metal complexes in the synthesis of polymers. According to one aspect, the present invention provides metal complexes comprising an activating species with catalytic activity tethered to a ligand that is coordinated to the active metal center of the complex.

4 Claims, No Drawings

CATALYSTS FOR POLYCARBONATE PRODUCTION

CROSS-REFERENCE TO RELATED APPLICATIONS

This application claims priority to U.S. Provisional Patent Application No. 62/609,649, filed Dec. 22, 2017, the entirety of which is hereby incorporated by reference.

BACKGROUND OF THE INVENTION

A variety of different metal complexes have shown utility in effecting the copolymerization of epoxides and carbon dioxide to form aliphatic polycarbonates (APCs), including complexes based on zinc or aluminum salts, double metal cyanide complexes, and more recently, those based on transition metal coordination complexes (e.g., porphyrin complexes, salen complexes, etc.). However, there remains a need for the continued development of novel metal complexes that have improved reaction and/or product purity characteristics.

SUMMARY OF THE INVENTION

The present invention provides, among other things, a unimolecular metal complex comprising a metal atom, an optionally present anion, a ligand comprising a tethered activating moiety, and a nitrogen atom that is both:
  i) singly bonded to a secondary carbon which is further covalently bonded to two phenol groups ortho to their phenolic oxygens, and
  ii) doubly bonded to a primary carbon which is further covalently bonded to one phenol group ortho to its phenolic oxygen,
wherein all phenolic oxygens are optionally and independently substituted with either an alkyl group or a hydroxyl protecting group and where phenolic oxygens that are unsubstituted can bind the metal atom.

Definitions

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. The invention additionally encompasses the compounds as individual isomers substantially free of other isomers and alternatively, as mixtures of various isomers, e.g., racemic mixtures of enantiomers. In certain embodiments, the compounds of the invention are enantiopure compounds. In certain embodiments, mixtures of enantiomers or diastereomers are provided. Furthermore, certain compounds, as described herein both singly and in combination may have one or more double bonds that can exist as either the Z or E isomer, unless otherwise indicated. In addition to compounds per se, this invention also encompasses compositions comprising one or more compounds.

Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, Ind. 1972).

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate)). In certain embodiments, a polymer of the present invention is a copolymer, terpolymer, heteropolymer, block copolymer, or tapered heteropolymer incorporating two or more different epoxide monomers.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein both singly and in combination, having from 3 to 12 members, wherein the aliphatic ring system is optionally substituted as defined above and described herein both singly and in combination. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 7-membered carbocycle" refers to a 3- to 7-membered saturated or partially unsaturated monocyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the term "6- to 10-membered aryl" refers to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be monoor bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocyclyl", "heterocyclic radical", and "heterocyclic ring", "heterocycle", "heterocyclic group", and "heterocyclic moiety", are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. Heterocycles also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

One of ordinary skill in the art will appreciate that the synthetic methods, as described herein both singly and in combination, utilize a variety of protecting groups. By the term "protecting group," as used herein, it is meant that a particular functional moiety, e.g., O, S, or N, is masked or blocked, permitting, if desired, a reaction to be carried out selectively at another reactive site in a multifunctional compound. In preferred embodiments, a protecting group reacts selectively in good yield to give a protected substrate that is stable to the projected reactions; the protecting group is preferably selectively removable by readily available, preferably non-toxic reagents that do not attack the other functional groups; the protecting group forms a separable derivative (more preferably without the generation of new stereogenic centers); and the protecting group will preferably have a minimum of additional functionality to avoid further sites of reaction. As detailed herein, oxygen, sulfur, nitrogen, and carbon protecting groups may be utilized. By way of non-limiting example, hydroxyl protecting groups include methyl, methoxylmethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethyl silyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl, p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxido, diphenylmethyl, p,p'-dinitrobenzhydryl, 5-dibenzosuberyl, triphenylmethyl, α-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4''-tris(4,5-dichlorophthalimidophenyl)methyl, 4,4',4''-tris(levulinoyloxyphenyl)methyl, 4,4',4''-tris(benzoyloxyphenyl)methyl, 3-(imidazol-1-yl)bis(4',4''-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxide, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), alkyl methyl carbonate, 9-fluorenylmethyl carbonate (Fmoc), alkyl ethyl carbonate, alkyl 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), alkyl isobutyl carbonate, alkyl vinyl carbonate alkyl allyl carbonate, alkyl p-nitrophenyl carbonate, alkyl benzyl carbonate, alkyl p-methoxybenzyl carbonate, alkyl 3,4-dimethoxybenzyl carbonate, alkyl o-nitrobenzyl carbonate, alkyl p-nitrobenzyl carbonate, alkyl S-benzyl thiocarbonate, 4-ethoxy-1-napthhyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxycarbonyl)benzoate, α-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts). For protecting 1,2- or 1,3-diols, the protecting groups include methylene acetal, ethylidene acetal, 1-t-butylethylidene ketal, 1-phenylethylidene ketal, (4-methoxyphenyl)ethylidene acetal, 2,2,2-trichloroethylidene acetal, acetonide, cyclopentylidene ketal, cyclohexylidene ketal, cycloheptylidene ketal, benzylidene acetal, p-methoxybenzylidene acetal, 2,4-dimethoxybenzylidene ketal, 3,4-dimethoxybenzylidene acetal, 2-nitrobenzylidene acetal, methoxymethylene acetal, ethoxymethylene acetal, dimethoxymethylene ortho ester, 1-methoxyethylidene ortho ester, 1-ethoxyethylidine ortho ester, 1,2-dimethoxyethylidene ortho ester, α-methoxybenzylidene ortho ester, 1-(N,N-dimethylamino)ethylidene derivative, α-(N,N'-dimethylamino)benzylidene derivative, 2-oxacyclopentylidene ortho ester, di-t-butylsilylene group (DTBS), 1,3-(1,1,3,3-tetraisopropyldisiloxanylidene) derivative (TIPDS), tetra-t-butoxydisiloxane-1,3-diylidene derivative (TBDS), cyclic carbonates, cyclic boronates, ethyl boronate, and phenyl boronate. Amino-protecting groups include methyl carbamate, ethyl carbamante, 9-fluorenylmethyl carbamate (Fmoc), 9-(2-sulfo)fluorenylmethyl carbamate, 9-(2,7-dibromo)fluoroenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylyl)ethyl carbamate (Bpoc), di-t-butylphenyl)-1-methylethyl carbamate (t-Bumeoc), 2-(2'- and 4'-pyridyl)ethyl carbamate (Pyoc), 2-(N,N-dicyclohexylcarboxamido)ethyl carbamate, t-butyl carbamate (BOC), 1-adamantyl carbamate (Adoc), vinyl carbamate (Voc), allyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitrobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 3,5-dimethoxybenzyl carbamate, o-nitrobenzyl carbamate, 3,4-dimethoxy-6-nitrobenzyl carbamate, phenyl(o-nitrophenyl)methyl carbamate, phenothiazinyl-(10)-carbonyl derivative, N'-p-toluenesulfonylaminocarbonyl derivative, N'-phenylaminothiocarbonyl derivative, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxycarbonylvinyl carbamate, o-(N,N-dimethylcarboxamido)benzyl carbamate, 1,1-dimethyl-3-(N,N-dimethylcarboxamido)propyl carbamate, 1,1-dimethylpropynyl carbamate, di(2-pyridyl)methyl carbamate, 2-furanylmethyl carbamate, 2-iodoethyl carbamate, isobornyl carbamate, isobutyl carbamate, isonicotinyl carbamate, p-(p'-methoxyphenylazo)benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl)ethyl carbamate, phenyl carbamate, p-(phenylazo)benzyl carbamate, 2,4,6-tri-t-butylphenyl carbamate, 4-(trimethylammonium) benzyl carbamate, 2,4,6-trimethylbenzyl carbamate, formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivative, benzamide, p-phenylbenzamide, o-nitrophenylacetamide, o-nitrophenoxyacetamide, acetoacetamide, (N'-dithiobenzyloxycarbonylamino)acetamide, 3-(p-hydroxyphenyl)propanamide, 3-(o-nitrophenyl)propanamide, 2-methyl-2-(o-nitrophenoxy)propanamide, 2-methyl-2-(o-phenylazophenoxy)propanamide, 4-chlorobutanamide, 3-methyl-3-nitrobutanamide, o-nitrocinnamide, N-acetylmethionine derivative, o-nitrobenzamide, o-(benzoyloxymethyl)benzamide, 4,5-diphenyl-3-oxazolin-2-one, N-phthalimide, N-dithiasuccinimide (Dts), N-2,3-diphenylmaleimide, N-2,5-dimethylpyrrole, N-1,1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone, N-methylamine, N-allylamine, N[2-(trimethylsilyl)ethoxy]methylamine (SEM), N-3-acetoxypropylamine, N-(1-isopropyl-4-nitro-2-oxo-3-pyroolin-3-yl)amine, quaternary ammonium salts, N-benzylamine, N-di(4-methoxyphenyl)methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylideneamine, N-diphenylmethyleneamine, N-[(2-pyridyl)mesityl]methyleneamine, N—(N',N'-dimethylaminomethylene) amine, N,N'-isopropylidenediamine, N-p-nitrobenzylideneamine, N-salicylideneamine, N-5-chlorosalicylideneamine, N-(5-chloro-2-hydroxyphenyl) phenylmethyleneamine, N-cyclohexylideneamine, N-(5,5-dimethyl-3-oxo-1-cyclohexenyl)amine, N-borane derivative, N-diphenylborinic acid derivative, N-[phenyl (pentacarbonylchromium- or tungsten)carbonyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, o-nitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, 3-nitropyridinesulfenamide (Npys), p-toluenesulfonamide (Ts), benzenesulfonamide, 2,3,6,-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), β-trimethylsilylethanesulfonamide (SES), 9-anthracenesulfonamide, 4-(4',8'-dimethoxynaphthylmethyl)benzenesulfonamide (DNMBS), benzyl sulfonamide, trifluoromethylsulfonamide, and phenacylsulfonamide. Exemplary protecting groups are detailed herein, however, it will be appreciated that the present invention is not intended to be limited to these protecting groups; rather, a variety of additional equivalent protecting groups can be readily identified using the above criteria and utilized in the method of the present invention. Additionally, a variety of protecting groups are described in *Protecting Groups in Organic Synthesis*, T. W. Greene and P. G. M. Wuts, 3$^{rd}$ edition, John Wiley & Sons, 1999, the entirety of which is incorporated herein by reference.

As described herein both singly and in combination, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen, —(CH$_2$)$_{0-4}$R°, —(CH$_2$)$_{0-4}$OR°, —O—(CH$_2$)$_{0-4}$C(O)OR°, —(CH$_2$)$_{0-4}$CH(OR°)$_2$, —(CH$_2$)$_{0-4}$SR°, —(CH$_2$)$_{0-4}$Ph, which may be substituted with R°, —(CH$_2$)$_{0-4}$O(CH$_2$)$_{0-1}$Ph which may be substituted with R°, —CH=CHPh, which may be substituted with R°, —NO$_2$, —CN, —N$_3$, —(CH$_2$)$_{0-4}$N(R°)$_2$, —(CH$_2$)$_{0-4}$N(R°)C(O)R°, —N(R°)C(S)R°, —(CH$_2$)$_{0-4}$N(R°)C(O)NR°$_2$, —N(R°)C(S)NR°$_2$, —(CH$_2$)$_{0-4}$N(R°)C(O)OR°, —N(R°)N(R°)C(O)R°, —N(R°)N(R°)C(O)NR°$_2$, —N(R°)N(R°)C(O)OR°, —(CH$_2$)$_{0-4}$C(O)R°, —C(S)R°, —(CH$_2$)$_{0-4}$C(O)OR°, —(CH$_2$)$_{0-4}$C(O)N(R°)$_2$, —(CH$_2$)$_{0-4}$C(O)SR°, —(CH$_2$)$_{0-4}$C(O)OSiR°$_3$, —(CH$_2$)$_{0-4}$OC(O)R°, —OC(O)(CH$_2$)$_{0-4}$SR°—, SC(S)SR°, —(CH$_2$)$_{0-4}$SC(O)R°, —(CH$_2$)$_{0-4}$C(O)NR°$_2$, —C(S)NR°$_2$, —C(S)SR°, —(CH$_2$)$_{0-4}$OC(O)NR°$_2$, —C(O)N(OR°)R°, —C(O)C(O)R°, —C(O)CH$_2$C(O)R°, —C(NOR°)R°, —(CH$_2$)$_{0-4}$SSR°, —(CH$_2$)$_{0-4}$S(O)$_2$R°, —(CH$_2$)$_{0-4}$S(O)$_2$OR°, —(CH$_2$)$_{0-4}$OS(O)$_2$R°, —S(O)$_2$NR°$_2$, —(CH$_2$)$_{0-4}$S(O)R°, —N(R°)S(O)$_2$NR°$_2$, —N(R°)S(O)$_2$R°, —N(OR°)R°, —C(NH)NR°$_2$, —P(O)$_2$R°, —P(O)R°$_2$, —OP(O)R°$_2$, —OP(O)(OR°)$_2$, SiR°$_3$, —(C$_{1-4}$ straight or branched alkylene)O—N(R°)$_2$, or —(C$_{1-4}$ straight or branched)alkylene)C(O)O—N(R°)$_2$, wherein each R° may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —(CH$_2$)$_{0-2}$R•, -(haloR•), —(CH$_2$)$_{0-2}$OH, —(CH$_2$)$_{0-2}$OR•, —(CH$_2$)$_{0-2}$CH(OR•)$_2$; —O(haloR•), —CN, —N$_3$, —(CH$_2$)$_{0-2}$C(O)R•, —(CH$_2$)$_{0-2}$C(O)OH, —(CH$_2$)$_{0-2}$C(O)OR•, —(CH$_2$)$_{0-4}$C(O)N(R°)$_2$; —(CH$_2$)$_{0-2}$SR•, —(CH$_2$)$_{0-2}$SH, —(CH$_2$)$_{0-2}$NH$_2$, —(CH$_2$)$_{0-2}$NHR•, —(CH$_2$)$_{0-2}$NR•$_2$, —NO$_2$, —SiR•$_3$, —OSiR•$_3$, —C(O)SR•, —(C$_{1-4}$ straight or branched alkylene)C(O)OR•, or —SSR• wherein each R• is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R•, -(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently C$_1$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R†, —NR†$_2$, —C(O)R†, —C(O)OR†, —C(O)C(O)R†, —C(O)CH$_2$C(O)R†, —S(O)$_2$R†, —S(O)$_2$NR†$_2$, —C(S)NR†$_2$, —C(NH)NR†$_2$, or —N(R†)S(O)$_2$R†; wherein each R† is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R†, taken together with their intervening atom(s) form an unsubstituted 3-12-membered saturated, partially unsaturated, or aryl mono- or bicyclic ring having 0-4 heteroatoms independently selected from nitrogen, oxygen, or sulfur. A substitutable nitrogen may be substituted with three R† substituents to provide a charged ammonium moiety —N$^+$(R†)$_3$, wherein the ammonium moiety is further complexed with a suitable counterion.

Suitable substituents on the aliphatic group of $R^†$ are independently halogen, —R•,-(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently $C_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

When substituents are described herein both singly and in combination, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the term "catalyst" refers to a substance the presence of which increases the rate and/or extent of a chemical reaction, while not being consumed or undergoing a permanent chemical change itself.

DETAILED DESCRIPTION OF CERTAIN EMBODIMENTS

The present invention provides, among other things, a unimolecular metal complex comprising a metal atom, an optionally present anion, a ligand comprising a tethered activating moiety, and a nitrogen atom that is both:
i) singly bonded to a secondary carbon which is further covalently bonded to two phenol groups ortho to their phenolic oxygens, and
ii) doubly bonded to a primary carbon which is further covalently bonded to one phenol group ortho to its phenolic oxygen,
wherein all phenolic oxygens are optionally and independently substituted with either an alkyl group or a hydroxyl protecting group and where phenolic oxygens that are unsubstituted can bind the metal atom.

In some embodiments, the nitrogen, the secondary carbon, and the two phenol groups to which the secondary carbon is further covalently bonded to are derived from an aminodiphenylmethane. In certain embodiments, the primary carbon and the one phenol group to which the primary carbon is further covalently bonded to are derived from a salicylaldehyde.

In some embodiments, provided metal complexes have the formula I:

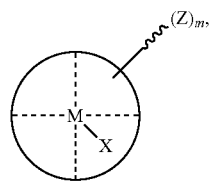

I wherein:
M is a metal atom;
X is optionally present and when present is an anion;

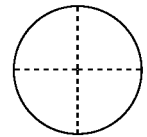

comprises a ligand having the formula:

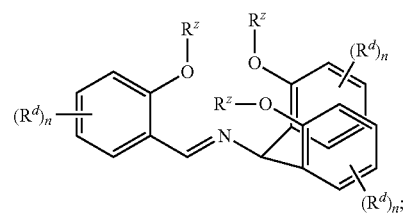

wherein each $R^d$ is independently selected from the group consisting of: —$\sim$(Z)$_m$, hydrogen, halogen, —OR, NR$_2$, —SR, —CN, —NO$_2$, —SO$_2$R, —SOR, —SO$_2$NR$_2$, —CNO, —CO$_2$R, —CON(R)$_2$, —OC(O)NR$_2$, —OC(O)OR, —NRSO$_2$R, —NCO, —N$_3$, —SiR$_3$, or an optionally substituted radical independently selected from the group consisting of $C_{1-20}$ aliphatic, $C_{1-20}$ heteroaliphatic, phenyl, a 3- to 8-membered saturated or partially unsaturated monocyclic carbocycle, a 7- to 14-membered saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur, where two or more $R^d$ groups may be taken together to form one or more optionally substituted rings optionally containing one or more heteroatoms;
each R is independently hydrogen or an optionally substituted radical selected the group consisting of acyl, $C_{1-20}$ aliphatic, $C_{1-20}$ heteroaliphatic, phenyl, a 3- to 8-membered saturated or partially unsaturated monocyclic carbocycle, a 7- to 14-membered saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur, an oxygen protecting group, and a nitrogen protecting group, where two R groups on the same nitrogen atom can optionally be taken together to form an optionally substituted 3- to 7-membered ring;

each n is independently an integer 1 to 4 inclusive;

each $R^z$ is optionally present and when present is independently alkyl or a hydroxyl protecting group, wherein the ligand has zero or one $R^z$ groups; and —⌇$(Z)_m$ represents a tethered activating moiety covalently bonded to the ligand at any suitable position, wherein each —⌇ represents a linker moiety, each Z independently comprises a nitrogen or phosphorous containing functional group, and m is an integer of one or greater indicating how many such nitrogen or phosphorous containing functional groups are attached to a given linker.

Metals

In some embodiments, M is a metal atom of oxidation state +3 or +4. In some embodiments, M is a metal atom of oxidation state +3. In some embodiments, M is a metal atom of oxidation state +4. In some embodiments, M is a metal atom selected from the group consisting of: Al, Co, Cr, Fe, Mn, Mo, Pt, Ti, Sn, V, and Zr. In some embodiments, M is a metal atom selected from the group consisting of: Al, Co, Cr, and Fe. In some embodiments, M is a metal atom selected from the group consisting of: Mn, Mo, Pt, Ti, Sn, V, and Zr. In some embodiments, M is Al. In some embodiments, M is Co. In some embodiments, M is Cr. In some embodiments, M is Fe.

Anions

In some embodiments, X is absent. In some embodiments, X is present and is an anion. In some embodiments, X is a nucleophile capable of ring opening an epoxide. In some embodiments, X is selected from the group consisting of halide, a complex inorganic ion (e.g., perchlorate), borates, sulfonates, sulfates, phosphates, phenolates, carbonates, and carboxylates. In some embodiments, X is selected from the group consisting of halide, hydroxide, carboxylate, sulfate, phosphate, —$OR^x$, —$O(C=O)R^x$, —NC, —CN, —$NO_3$, —$N_3$, —$O(SO_2)R^x$ and —$OP(R^x)_3$, wherein each $R^x$ is, independently, selected from hydrogen, optionally substituted aliphatic, optionally substituted heteroaliphatic, optionally substituted aryl and optionally substituted heteroaryl. In some embodiments, X is selected from the group consisting of: acetate, trifluoroacetate, chloride, bromide, nitrate, carbonate, benzoate, and azide.

Chelation and Phenolic Oxygen Substitution ($R^z$)

In some embodiments, the ligand has zero $R^z$ groups. In some embodiments, the ligand has one $R^z$ group. In some embodiments, $R^z$ is alkyl. In some embodiments, $R^z$ is methyl. In some embodiments, $R^z$ is a hydroxyl protecting group.

In some embodiments of provided metal complexes, a

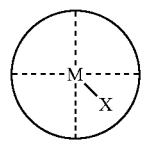

moiety has a formula selected from Formulae Ia, Ib, Ic, or Id:

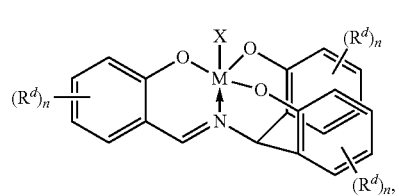

Ia

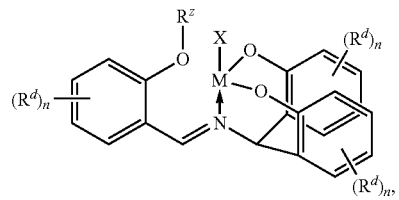

Ib

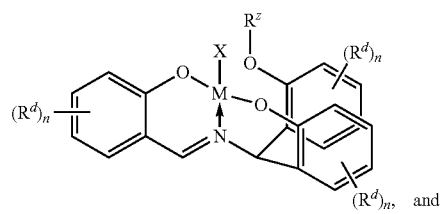

Ic

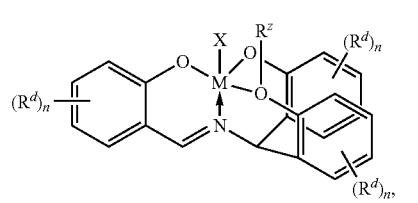

Id wherein each of M, X, $R^d$, n, and $R^z$ are as defined above and described in classes and subclasses herein, both singly and in combination.

Tether Position ($R^d$)

In some embodiments of the above formulae, n is 0 for one, two, or three instances of $(R^d)_n$. In some embodiments of the above formulae, n is 1 for one, two, or three instances of $(R^d)_n$. In some embodiments of the above formulae, n is 2 for one, two, or three instances of $(R^d)_n$. In some embodiments of the above formulae, n is 3 for one, two, or three instances of $(R^d)_n$. In some embodiments of the above formulae, n is 4 for one, two, or three instances of $(R^d)_n$. In some embodiments of the above formulae, n is 2 for one instances of $(R^d)_n$, and n is 0 for the other instances of $(R^d)_n$ In some embodiments of the above formulae, each phenolic ring portion of a metal complex independently comprises a substructure:

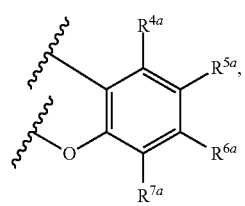

wherein:

each $R^{4a}$, $R^{5a}$, $R^{6a}$, and $R^{7a}$ is independently selected from the group consisting of:

—⁓ $(Z)_m$, hydrogen, halogen, —OR, NR$_2$, —SR, —CN, —NO$_2$, —SO$_2$R, —SOR, —SO$_2$NR$_2$, —CNO, —CO$_2$R, —CON(R)$_2$, —OC(O)NR$_2$, —OC(O)OR, —NRSO$_2$R, —NCO, —N$_3$, or an optionally substituted radical selected from the group consisting of C$_{1-20}$ aliphatic, C$_{1-20}$ heteroaliphatic, phenyl, a 3- to 8-membered saturated or partially unsaturated monocyclic carbocycle, a 7- to 14-membered saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur, wherein any two adjacent $R^{4a}$, $R^{5a}$, $R^{6a}$, and $R^{7a}$ groups may be taken together with intervening atoms to form one or more optionally substituted rings optionally containing one or more heteroatoms; and wherein —⁓ $(Z)_m$ and R are as defined above and described in classes and subclasses herein, both singly and in combination.

In some embodiments, $R^{4a}$, $R^{5a}$, $R^{6a}$, and $R^{7a}$ are each hydrogen. In some embodiments, $R^{4a}$, $R^{6a}$, and $R^{7a}$ are each hydrogen. In some embodiments, $R^{4a}$ and $R^{6a}$ are each hydrogen. In some embodiments, $R^{5a}$ and $R^{7a}$ are independently selected from the group consisting of —⁓ $(Z)_m$, hydrogen, methyl, ethyl, n-propyl, i-propyl, n-butyl, sec-butyl, t-butyl, isoamyl, t-amyl, thexyl, and trityl. In some embodiments, one or both of $R^{5a}$ and $R^{7a}$ is a —⁓ $(Z)_m$ group. In some embodiments, $R^{7a}$ is selected from the group consisting of hydrogen, methyl, ethyl, n-propyl, i-propyl, n-butyl, sec-butyl, t-butyl, isoamyl, t-amyl, thexyl, and trityl. In some embodiments, $R^{5a}$ is a —⁓ $(Z)_m$ group.

In some embodiments, a phenolic ring portion of a metal complex comprises a substructure selected from the group consisting of:

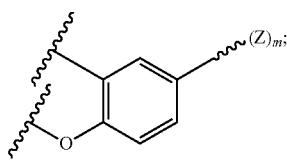

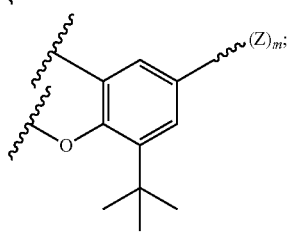

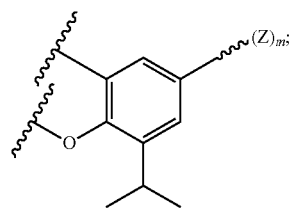

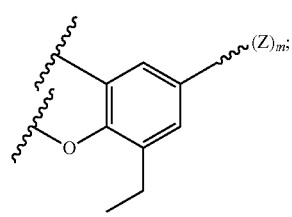

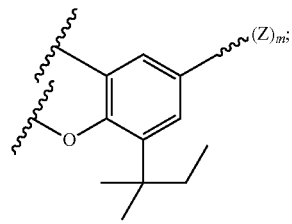

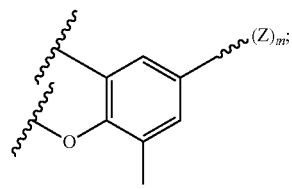

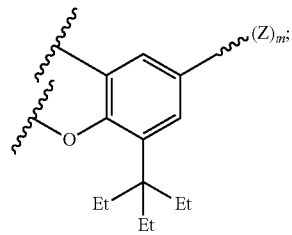

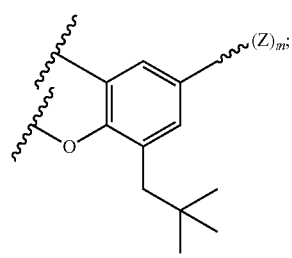

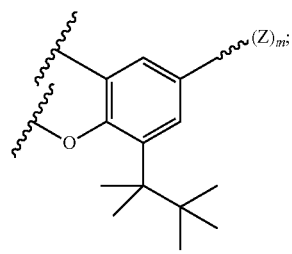

-continued

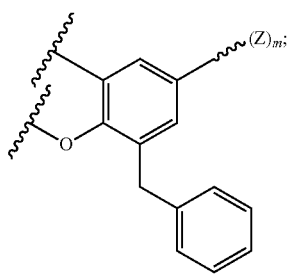

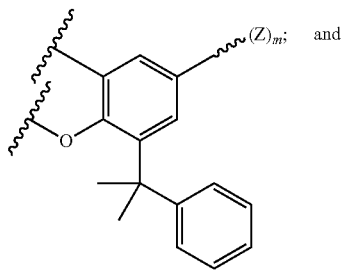 and

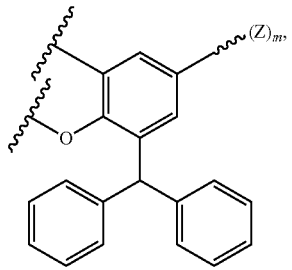

wherein ⟿(Z)$_m$ is as defined above and described in classes and subclasses herein, both singly and in combination.

In some embodiments, R$^{5a}$ is selected from the group consisting of hydrogen, methyl, ethyl, n-propyl, i-propyl, n-butyl, sec-butyl, t-butyl, isoamyl, t-amyl, thexyl, and trityl. In some embodiments, R$^{7a}$ is a ⟿(Z)$_m$ group. In some embodiments, a phenolic ring portion of a metal complex comprises a substructure selected from the group consisting of:

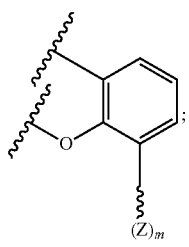 ; 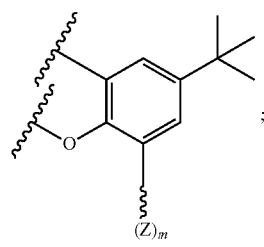 ;

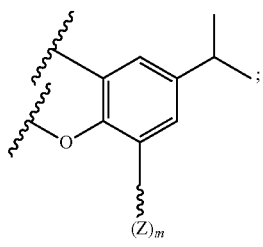 ;

-continued

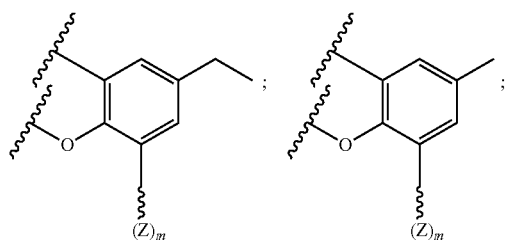

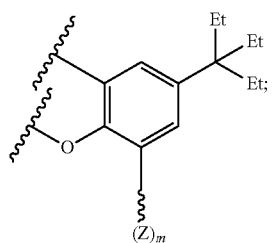

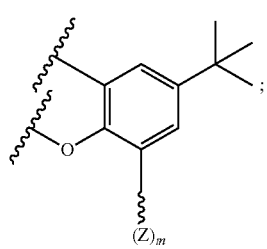

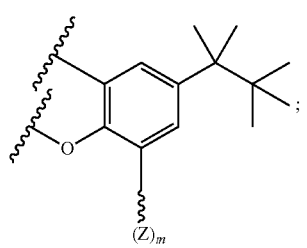

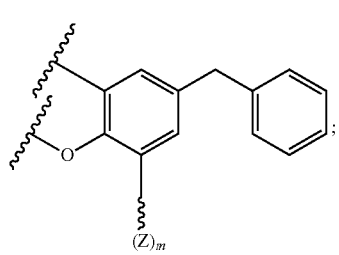

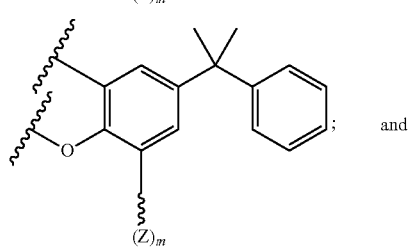 and

-continued

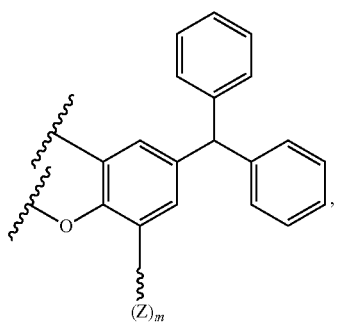

wherein ⁓(Z)$_m$ is as defined above and described in classes and subclasses herein, both singly and in combination.

In some embodiments, R$^{4a}$, R$^{5a}$, and R$^{7a}$ are each hydrogen. In some embodiments, R$^{4a}$ and R$^{5a}$ are each hydrogen. In some embodiments, R$^{4a}$ and R$^{7a}$ are each hydrogen. In some embodiments, R$^{4a}$ is hydrogen. In some embodiments, R$^{4a}$ and R$^{6a}$ are independently selected from the group consisting of ⁓(Z)$_m$, hydrogen, methyl, ethyl, n-propyl, i-propyl, n-butyl, sec-butyl, t-butyl, isoamyl, t-amyl, thexyl, and trityl. In some embodiments, one or both of R$^{4a}$ and R$^{6a}$ is a ⁓(Z)$_m$ group. In some embodiments, R$^{5a}$ and R$^{7a}$ are each independently selected from the group consisting of hydrogen, methyl, ethyl, n-propyl, i-propyl, n-butyl, sec-butyl, t-butyl, isoamyl, t-amyl, thexyl, and trityl. In some embodiments, R$^{5a}$ is selected from the group consisting of hydrogen, methyl, ethyl, n-propyl, i-propyl, n-butyl, sec-butyl, t-butyl, isoamyl, t-amyl, thexyl, and trityl. In some embodiments, R$^{7a}$ is selected from the group consisting of hydrogen, methyl, ethyl, n-propyl, i-propyl, n-butyl, sec-butyl, t-butyl, isoamyl, t-amyl, thexyl, and trityl. In some embodiments, R$^{6a}$ is a ⁓(Z)$_m$ group. In some embodiments, a phenolic ring portion of a metal complex comprises a substructure selected from the group consisting of:

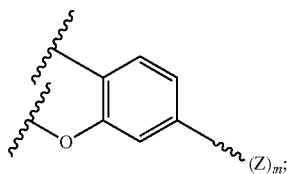

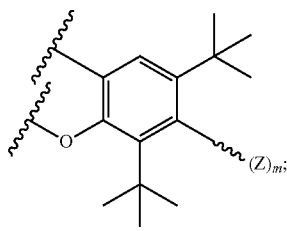

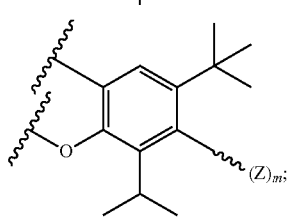

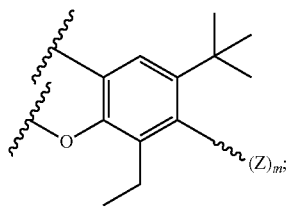

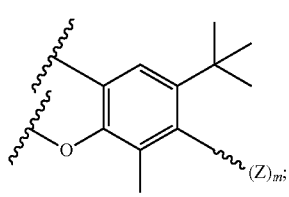

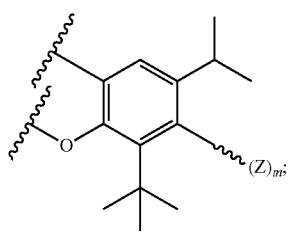

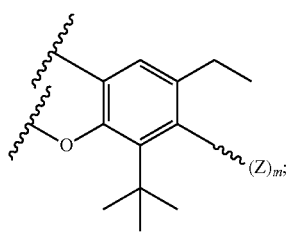

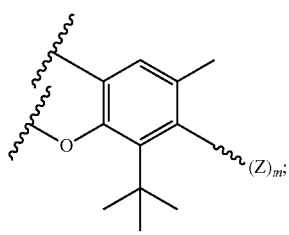

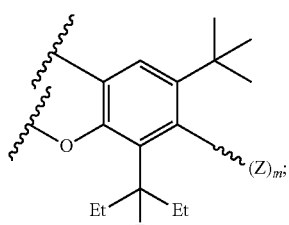

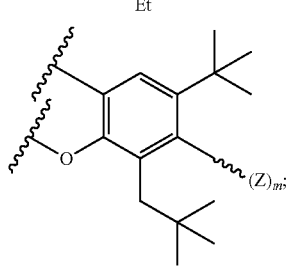

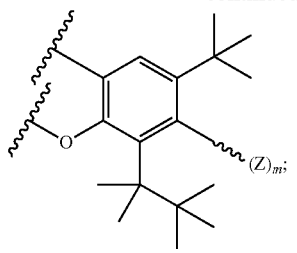

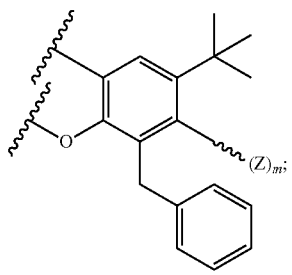

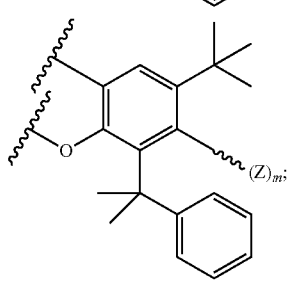

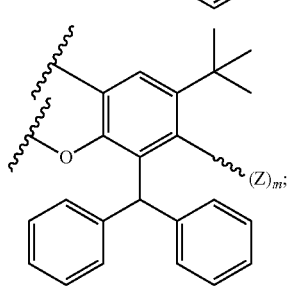

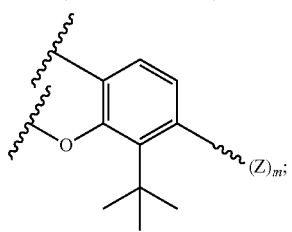

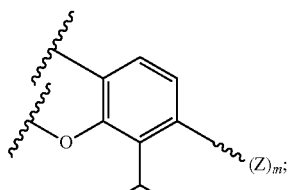

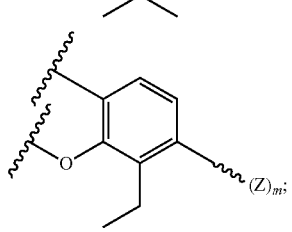

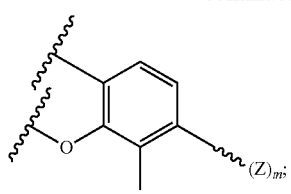

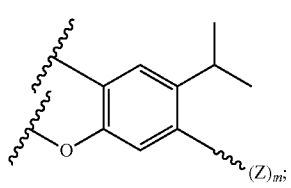

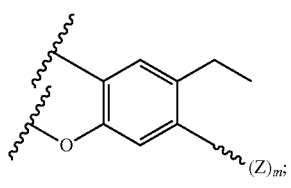

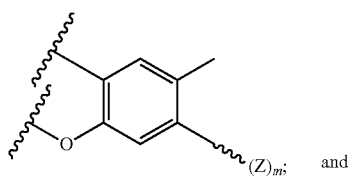

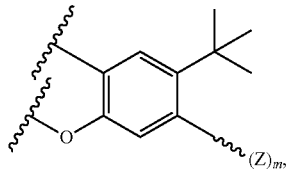

wherein ⁓$(Z)_m$ is as defined above and described in classes and subclasses herein, both singly and in combination.

In some embodiments, $R^{5a}$, $R^{6a}$, and $R^{7a}$ are each hydrogen. In some embodiments, $R^{5a}$ and $R^{6a}$ are each hydrogen. In some embodiments, $R^{6a}$ and $R^{7a}$ are each hydrogen. In some embodiments, $R^{6a}$ is hydrogen. In some embodiments, $R^{4a}$ is a ⁓$(Z)_m$ group. In some embodiments, a phenolic ring portion of a metal complex comprises a substructure selected from the group consisting of:

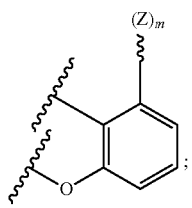 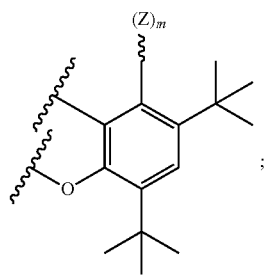

-continued
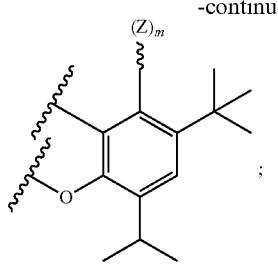
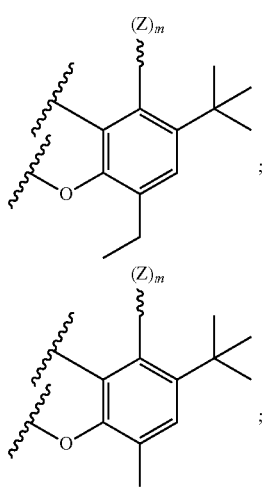
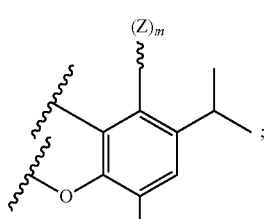
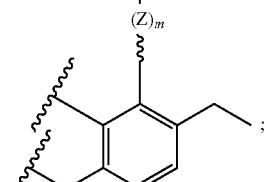
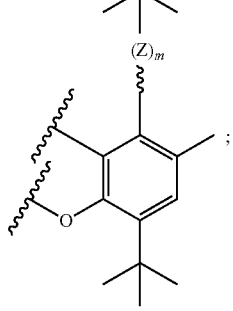
-continued
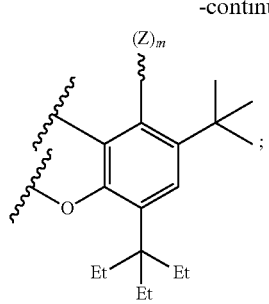
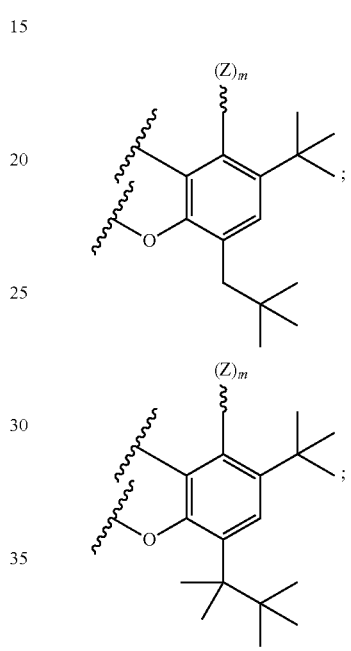
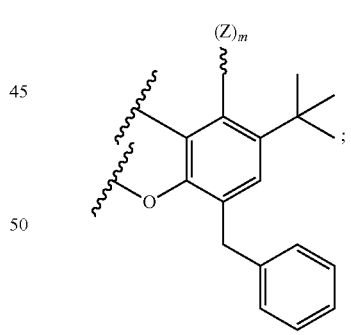
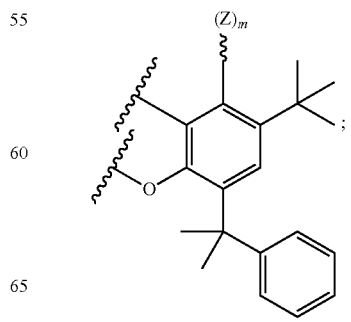

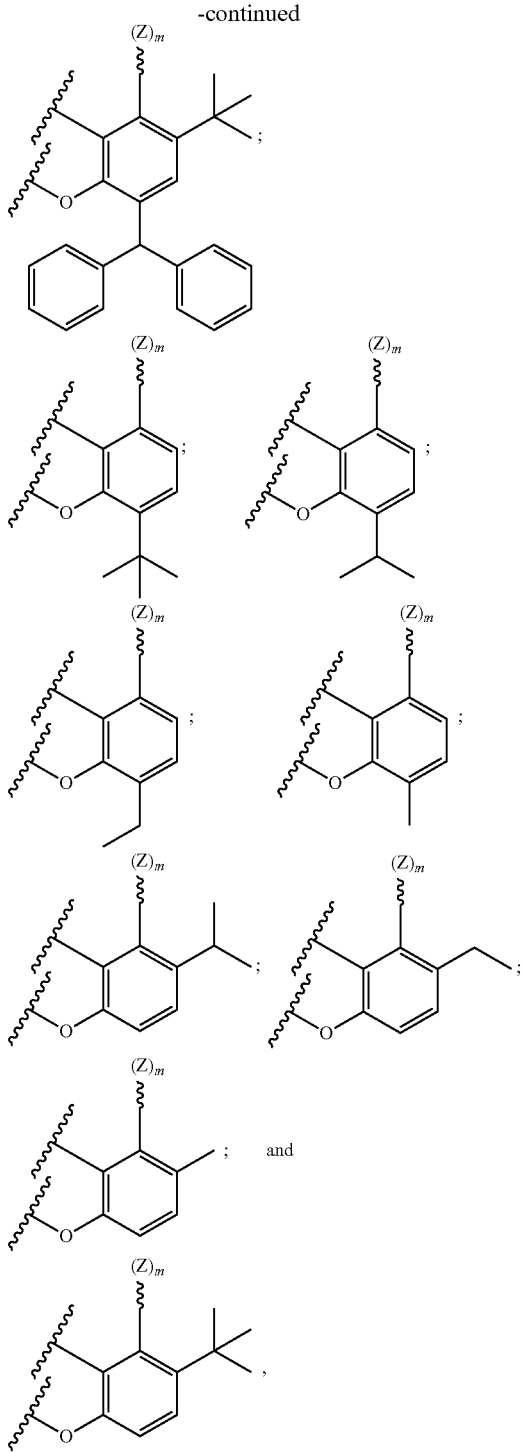

wherein —ᴡᴡ (Z)$_m$ is as defined above and described in classes and subclasses herein, both singly and in combination.

In some embodiments of the above formulae under this heading "Tethering Position (R$^d$)" at least one of the phenyl rings is derived from a salicylaldehyde. In some embodiments, at least one activating moiety is tethered to a carbon atom of a phenyl ring of the salicylaldehyde-derived portion of a ligand. In some embodiments, two of the phenyl rings are derived from an aminodiphenylmethane.

Linker

In certain embodiments, each linker moiety —ᴡᴡ comprises 1-30 atoms including at least one carbon atom, and optionally one or more atoms selected from the group consisting of N, O, S, Si, B, and P.

In certain embodiments, a linker moiety —ᴡᴡ is an optionally substituted C$_{2-30}$ aliphatic group wherein one or more methylene units are optionally and independently replaced by —NR$^y$—, —N(R$^y$)C(O)—, —C(O)N(R$^y$)—, —O—, —C(O)—, —OC(O)—, —C(O)O—, —S—, —SO—, —SO$_2$—, —C(=S)—, —C(=NR$^y$)—, or —N=N—, where each occurrence of R$^y$ is independently —H, or an optionally substituted radical selected from the group consisting of C$_{1-6}$ aliphatic, 3- to 7-membered heterocyclic, phenyl, and 8- to 10- membered aryl. In certain embodiments, a linker moiety is a C$_4$-C$_{12}$ aliphatic group substituted with one or more moieties selected from the group consisting of halogen, —NO$_2$, —CN, —SR$^y$, —S(O)R$^y$, —S(O)$_2$R$^y$, —NR$^y$C(O)R$^y$, —OC(O)R$^y$, —CO$_2$R$^y$, —NCO, —CNO, —SiR$_3$, —N$_3$, —OR$^y$, —OC(O)N(R$^y$)$_2$, —N(R$^y$)$_2$, —NR$^y$C(O)R$^y$, —NR$^y$C(O)OR$^y$, —C(O)R$^y$, C(O)N(R$^y$)$_2$, —SO$_2$N(R$^y$)$_2$, —N(R$^y$)C(O)N(R$^y$)$_2$, —N(R)SO$_2$R; where R$^y$ is —H, or an optionally substituted radical selected from the group consisting of C$_{1-6}$ aliphatic 3- to 7-membered heterocyclic, phenyl, and 8- to 10- membered aryl.

In certain embodiments, —ᴡᴡ is an optionally substituted C$_3$-C$_{30}$ aliphatic group. In certain embodiments, —ᴡᴡ is an optionally substituted C$_{4-24}$ aliphatic group. In certain embodiments, —ᴡᴡ is an optionally substituted C$_4$-C$_{20}$ aliphatic group. In certain embodiments, —ᴡᴡ is an optionally substituted C$_4$-C$_{12}$ aliphatic group. In certain embodiments, —ᴡᴡ is an optionally substituted C$_{4-10}$ aliphatic group. In certain embodiments, —ᴡᴡ is an optionally substituted C$_{4-8}$ aliphatic group. In certain embodiments, —ᴡᴡ is an optionally substituted C$_4$-C$_6$ aliphatic group. In certain embodiments, —ᴡᴡ is an optionally substituted C$_6$-C$_{12}$ aliphatic group. In certain embodiments, —ᴡᴡ is an optionally substituted C$_8$ aliphatic group. In certain embodiments, —ᴡᴡ is an optionally substituted C$_7$ aliphatic group. In certain embodiments, —ᴡᴡ is an optionally substituted C$_6$ aliphatic group. In certain embodiments, —ᴡᴡ is an optionally substituted C$_5$ aliphatic group. In certain embodiments, —ᴡᴡ is an optionally substituted C$_4$ aliphatic group. In certain embodiments, —ᴡᴡ is an optionally substituted C$_3$ aliphatic group. In certain embodiments, a aliphatic group in the linker moiety is an optionally substituted straight alkyl chain. In certain embodiments, the aliphatic group is an optionally substituted branched alkyl chain. In some embodiments, a —ᴡᴡ is a C$_4$ to C$_{20}$ alkyl group having one or more methylene groups replaced by —C(R$^a$R$^b$)— where R$^a$ and R$^b$ are each independently C$_1$-C$_4$ alkyl groups. In certain embodiments, a —ᴡᴡ consists of an aliphatic group having 4 to 30 carbons including one or more gem-dimethyl substituted carbon atoms.

In certain embodiments, —ᴡᴡ includes one or more optionally substituted cyclic elements selected from the group consisting of saturated or partially unsaturated carbocyclic, aryl, heterocyclic, or heteroaryl. In certain embodiments, —ᴡᴡ consists of the substituted cyclic element. In some embodiments the cyclic element is part of a linker with one or more non-ring heteroatoms or optionally substituted aliphatic groups comprising other parts of the linker moiety.

In some embodiments, —ᴡᴡ is of sufficient length to allow one or more activating functional groups to be positioned near a metal atom of a metal complex. In certain embodiments, structural constraints are built into —~~— to control the disposition and orientation of one or more activating functional groups near a metal center of a metal complex. In certain embodiments such structural constraints are selected from the group consisting of cyclic moieties, bicyclic moieties, bridged cyclic moieties and tricyclic moieties. In some embodiments, such structural constraints are the result of acyclic steric interactions. In certain embodiments such structural constraints are selected from the group consisting of cis double bonds, trans double bonds, cis allenes, trans allenes, and triple bonds. In some embodiments, such structural constraints are selected from the group consisting of substituted carbons including geminally disubstituted groups such as spirocyclic rings, gem dimethyl groups, gem diethyl groups and gem diphenyl groups. In certain embodiments such structural constraints are selected from the group consisting of heteroatom-containing functional groups such as sulfoxides, amides, and oximes.

In certain embodiments, —~~— is selected from the group consisting of:

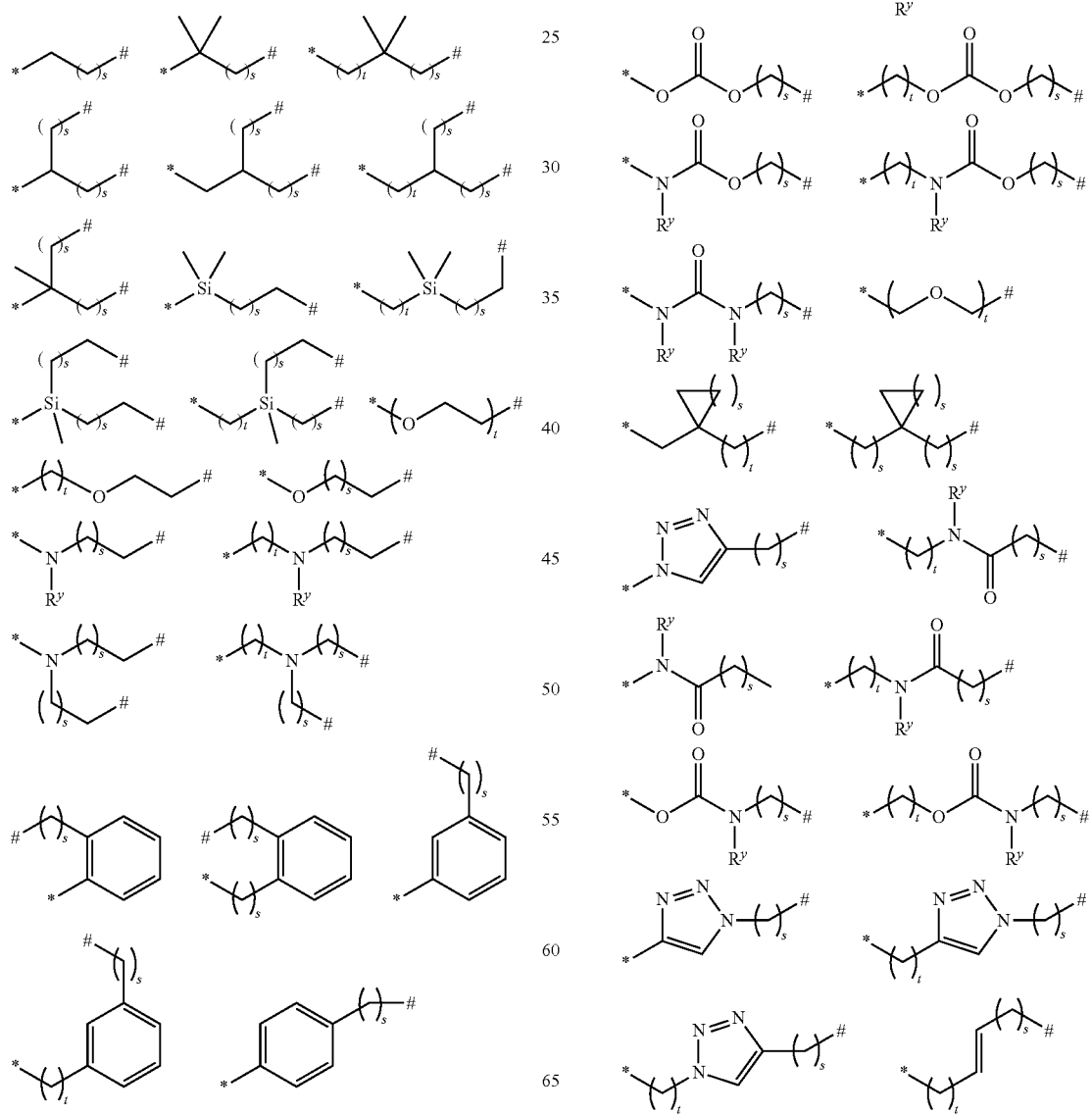

-continued

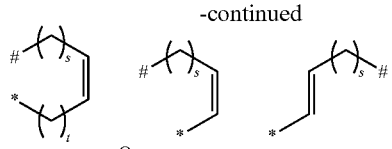

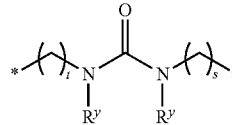

where s = 0-6 and t = 1-4,

* represents the site of attachment to a ligand, and each # represents a site of attachment of an activating functional group.

In some embodiments, s is 0. In some embodiments, s is 1. In some embodiments, s is 2. In some embodiments, s is 3. In some embodiments, s is 4. In some embodiments, s is 5. In some embodiments, s is 6.

In some embodiments, t is 1. In some embodiments, t is 2. In some embodiments, t is 3. In some embodiments, t is 4.

In some embodiments of provided metal complexes, each $R^y$ is —H, or an optionally substituted radical selected from the group consisting of $C_{1-6}$ aliphatic, 3- to 7-membered heterocyclic, phenyl, and 8- to 10- membered aryl. In some embodiments, an $R^y$ group attached to a nitrogen, oxygen, or sulfur atom on a provided metal complex is other than hydrogen.

In some embodiments of provided metal complexes, each R is —H, or an optionally substituted radical selected from the group consisting of $C_{1-6}$ aliphatic, 3- to 7-membered heterocyclic, phenyl, and 8- to 10-membered aryl. In some embodiments, an R group attached to a nitrogen, oxygen, or sulfur atom on a provided metal complex is other than hydrogen.

In some embodiments, an activating moiety $\text{---}\!\!\!\sim\!\!\!(Z)_m$ has a formula,

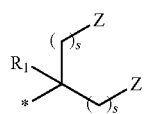

where $R^1$, *, s, and Z are as defined above. In certain embodiments, an activating moiety $\text{---}\!\!\!\sim\!\!\!(Z)_m$ has a formula

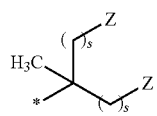

where *, s, and Z are as defined above. In certain embodiments, an activating moiety $\text{---}\!\!\!\sim\!\!\!(Z)_m$ has a formula

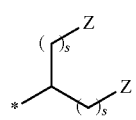

where *, s, and Z are as defined above and described in classes and subclasses herein. In certain embodiments, an activating moiety $\text{---}\!\!\!\sim\!\!\!(Z)_m$ has a formula selected from the group consisting of:

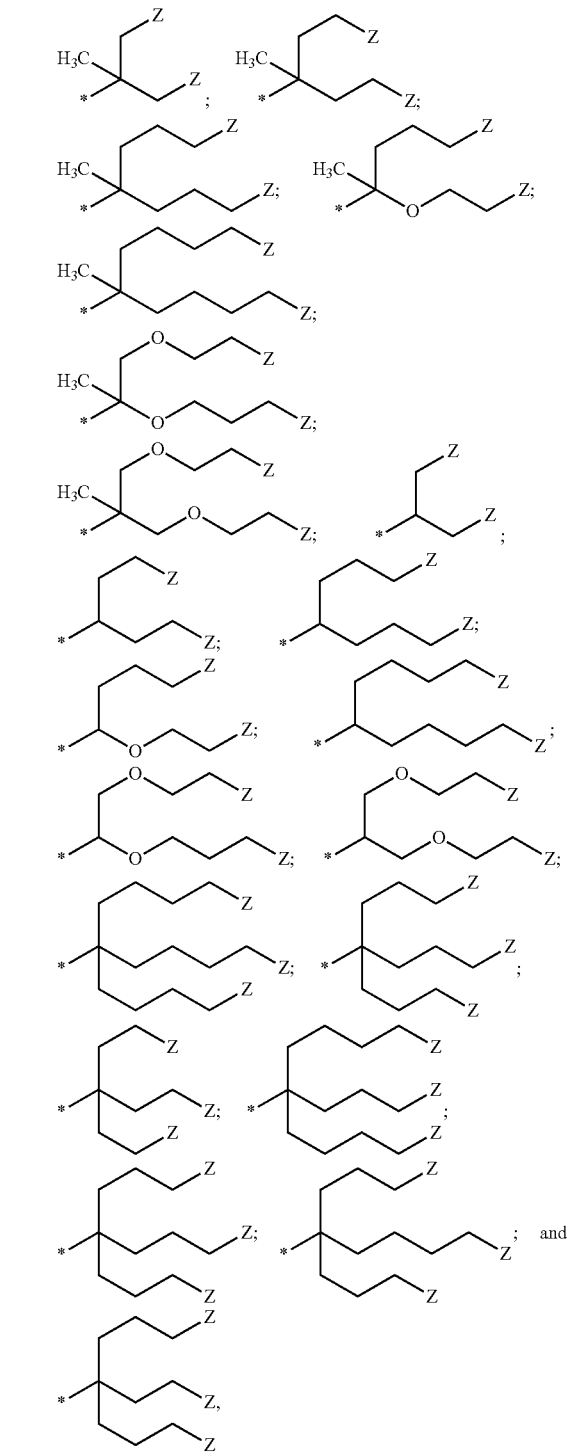

where Z and * are as defined above and described in classes and subclasses herein.

In certain embodiments, an activating moiety $\text{---}\!\!\!\sim\!\!\!(Z)_m$ has a formula selected from the group consisting of:

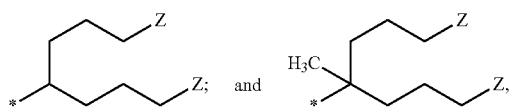

where Z, and * are as defined above and described in classes and subclasses herein.

In certain embodiments, an activating moiety —ᵐ—(Z)$_m$ has a formula selected from the group consisting of:

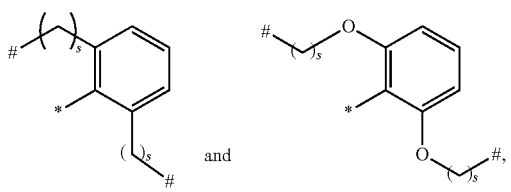

where *, #, and s are as defined above and described in classes and subclasses herein. In certain embodiments, an activating moiety —ᵐ—(Z)$_m$ has a formula selected from the group consisting of:

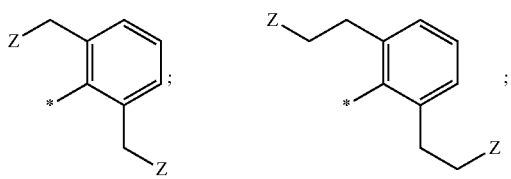

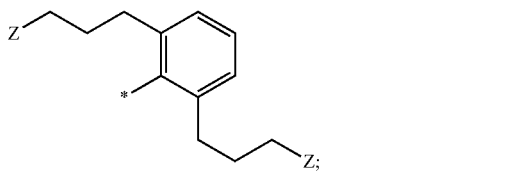

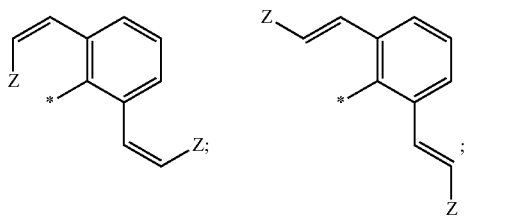

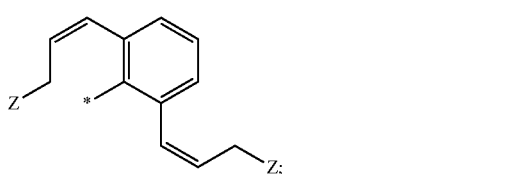

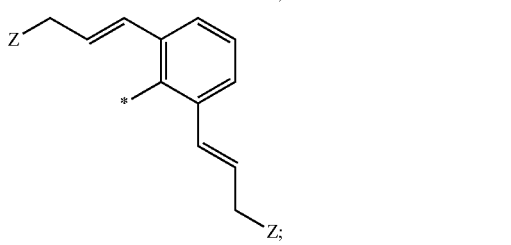

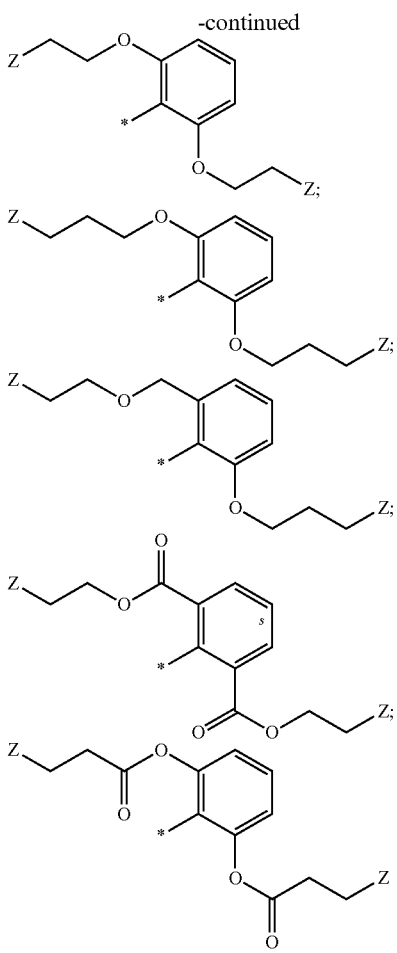

where Z, and * are as defined above and described in classes and subclasses herein.

In certain embodiments, an activating moiety —ᵐ—(Z)$_m$ has a formula selected from the group consisting of:

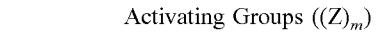
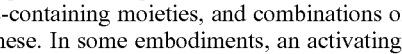

where Z and * are as defined above and described in classes and subclasses herein.

Activating Groups ((Z)$_m$)

In some embodiments, each activating functional group is independently selected from the group consisting of neutral nitrogen-containing moieties, cationic moieties, phosphorous-containing moieties, and combinations of two or more of these. In some embodiments, an activating group has no free amines. The term "no free amines", as used herein, refers to a nitrogen-containing group having no nitrogen atoms bearing a hydrogen in any tautomeric or resonance form.

In some embodiments of $(Z)_m$, m is 1. In some embodiments m is 2.

Neutral Nitrogen-Containing Activating Groups

In some embodiments, one or more Z groups on provided metal complexes are neutral nitrogen-containing moieties. In some embodiments, such neutral nitrogen-containing moieties include one or more of the structures in Table Z-1:

TABLE Z-1

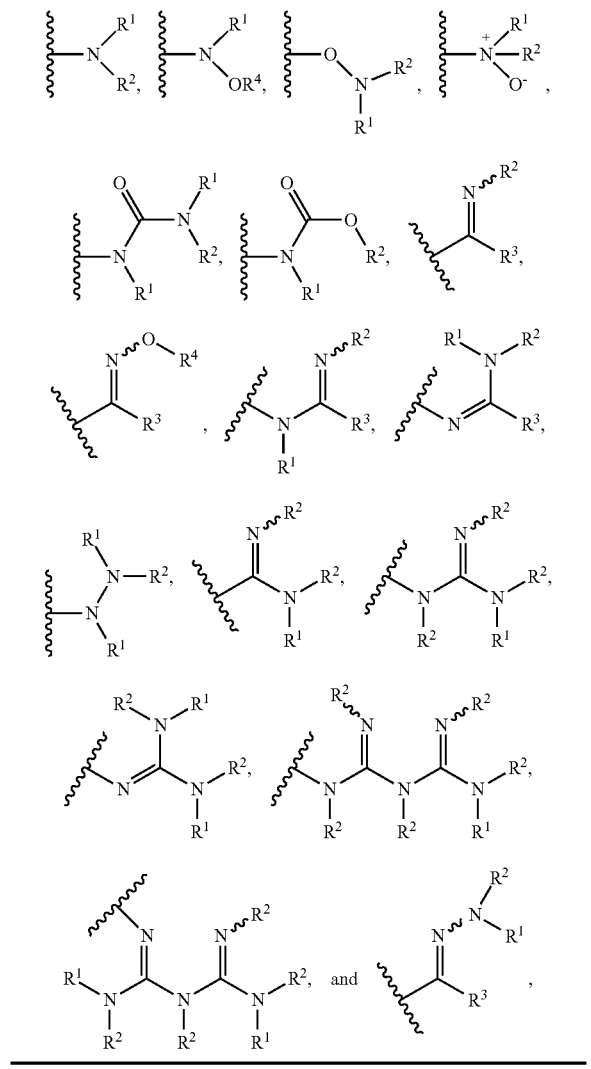

wherein:
each $R^1$, $R^2$, and $R^3$ is independently hydrogen or an optionally substituted radical selected from the group consisting of $C_{1-20}$ aliphatic, $C_{1-20}$ heteroaliphatic, a 3- to 8-membered saturated or partially unsaturated monocyclic carbocycle, a 7- to 14-membered saturated or partially unsaturated polycyclic carbocycle, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, a 3- to 8-membered saturated or partially unsaturated monocyclic heterocyclic ring having 1-3 heteroatoms independently selected from nitrogen, oxygen, or sulfur, a 6- to 14-membered saturated or partially unsaturated polycyclic heterocycle having 1-5 heteroatoms independently selected from nitrogen, oxygen, or sulfur, phenyl, or an 8- to 14-membered polycyclic aryl ring;
wherein two or more $R^1$ and $R^2$ groups can be taken together to form one or more optionally substituted rings optionally containing one or more additional heteroatoms, and wherein an $R^3$ group can be taken with an $R^1$ or $R^2$ group to form one or more optionally substituted rings; and
each $R^4$ is independently hydrogen, a hydroxyl protecting group, or an optionally substituted radical selected from the group consisting of $C_{1-20}$ acyl, $C_{1-20}$ aliphatic, $C_{1-20}$ heteroaliphatic, a 3- to 8-membered saturated or partially unsaturated monocyclic carbocycle, a 7- to 14-membered saturated or partially unsaturated polycyclic carbocycle, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, a 3- to 8-membered saturated or partially unsaturated monocyclic heterocyclic ring having 1-3 heteroatoms independently selected from nitrogen, oxygen, or sulfur, a 6- to 14-membered saturated or partially unsaturated polycyclic heterocycle having 1-5 heteroatoms independently selected from nitrogen, oxygen, or sulfur, phenyl; or an 8- to 14-membered polycyclic aryl ring;
wherein $R^1$ and $R^4$ can be taken together to form one or more optionally substituted heterocyclic or heteroaryl rings optionally containing one or more additional heteroatoms.

In certain embodiments, each $R^1$ group is the same. In other embodiments, $R^1$ groups are different. In certain embodiments, $R^1$ is hydrogen. In some embodiments, $R^1$ is an optionally substituted radical selected from the group consisting of $C_{1-20}$ aliphatic, $C_{1-20}$ heteroaliphatic, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, phenyl, 8- to 10-membered aryl, and 3- to 7-membered heterocyclic having 1-2 heteroatoms independently selected from nitrogen, oxygen, or sulfur. In some embodiments, $R^1$ is an optionally substituted radical selected from the group consisting of a 3- to 8-membered saturated or partially unsaturated monocyclic carbocycle, a 7- to 14-membered saturated or partially unsaturated polycyclic carbocycle, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, a 3- to 8-membered saturated or partially unsaturated monocyclic heterocyclic ring having 1-3 heteroatoms independently selected from nitrogen, oxygen, or sulfur, a 6- to 14-membered saturated or partially unsaturated polycyclic heterocycle having 1-5 heteroatoms independently selected from nitrogen, oxygen, or sulfur; phenyl, or an 8- to 14-membered polycyclic aryl ring.

In certain embodiments, $R^1$ is an optionally substituted radical selected from the group consisting of $C_{1-12}$ aliphatic and $C_{1-12}$ heteroaliphatic. In some embodiments, $R^1$ is optionally substituted $C_{1-20}$ aliphatic. In some embodiments, $R^1$ is optionally substituted $C_{1-12}$ aliphatic. In some embodiments, $R^1$ is optionally substituted $C_{1-6}$ aliphatic. In some embodiments, $R^1$ is optionally substituted $C_{1-20}$ heteroaliphatic. In some embodiments, $R^1$ is optionally substituted $C_{1-12}$ heteroaliphatic. In some embodiments, $R^1$ is optionally substituted phenyl. In some embodiments, $R^1$ is optionally substituted 8- to 10-membered aryl. In some embodiments, $R^1$ is an optionally substituted 5- to 6-membered heteroaryl group. In some embodiments, $R^1$ is an optionally substituted 8- to 14-membered polycyclic heteroaryl group. In some embodiments, $R^1$ is optionally substituted 3- to 8-membered heterocyclic.

In certain embodiments, each $R^1$ is independently hydrogen, methyl, ethyl, propyl, butyl, pentyl, hexyl, heptyl, octyl, optionally substituted phenyl, or optionally substituted benzyl. In certain embodiments, $R^1$ is methyl, ethyl, propyl, butyl, pentyl, hexyl, heptyl, octyl, phenyl or benzyl. In some embodiments, $R^1$ is butyl. In some embodiments, $R^1$ is isopropyl. In some embodiments, $R^1$ is neopentyl. In some embodiments, $R^1$ is perfluoro. In some embodiments, $R^1$ is $-CF_2CF_3$. In some embodiments, $R^1$ is phenyl. In some embodiments, $R^1$ is benzyl.

In certain embodiments, each $R^2$ group is the same. In other embodiments, $R^2$ groups are different. In certain embodiments, $R^2$ is hydrogen. In some embodiments, $R^2$ is an optionally substituted radical selected from the group consisting of $C_{1-20}$ aliphatic, $C_{1-20}$ heteroaliphatic, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, phenyl, 8- to 10-membered aryl, and 3- to 7-membered heterocyclic. In some embodiments, $R^2$ is an optionally substituted radical selected from the group consisting of a 3- to 8-membered saturated or partially unsaturated monocyclic carbocycle, a 7- to 14-membered saturated or partially unsaturated polycyclic carbocycle, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, a 3- to 8-membered saturated or partially unsaturated monocyclic heterocyclic ring having 1-3 heteroatoms independently selected from nitrogen, oxygen, or sulfur, a 6- to 14-membered saturated or partially unsaturated polycyclic heterocycle having 1-5 heteroatoms independently selected from nitrogen, oxygen, or sulfur, phenyl, or an 8- to 14-membered polycyclic aryl ring.

In certain embodiments, $R^2$ is an optionally substituted radical selected from the group consisting of $C_{1-12}$ aliphatic and $C_{1-12}$ heteroaliphatic. In some embodiments, $R^2$ is optionally substituted $C_{1-20}$ aliphatic. In some embodiments, $R^2$ is optionally substituted $C_{1-12}$ aliphatic. In some embodiments, $R^2$ is optionally substituted $C_{1-6}$ aliphatic. In some embodiments, $R^2$ is optionally substituted $C_{1-20}$ heteroaliphatic. In some embodiments, $R^2$ is optionally substituted $C_{1-12}$ heteroaliphatic. In some embodiments, $R^2$ is optionally substituted phenyl. In some embodiments, $R^2$ is optionally substituted 8- to 10-membered aryl. In some embodiments, $R^2$ is an optionally substituted 5- to 6-membered heteroaryl group. In some embodiments, $R^2$ is an optionally substituted 8- to 14-membered polycyclic heteroaryl group. In some embodiments, $R^2$ is optionally substituted 3- to 8-membered heterocyclic.

In certain embodiments, each $R^2$ is independently hydrogen, methyl, ethyl, propyl, butyl, pentyl, hexyl, heptyl, octyl, optionally substituted phenyl, or optionally substituted benzyl. In certain embodiments, $R^2$ is methyl, ethyl, propyl, butyl, pentyl, hexyl, heptyl, octyl, phenyl, or benzyl. In some embodiments, $R^2$ is butyl. In some embodiments, $R^2$ is isopropyl. In some embodiments, $R^2$ is neopentyl. In some embodiments, $R^2$ is perfluoro. In some embodiments, $R^2$ is $-CF_2CF_3$. In some embodiments, $R^2$ is phenyl. In some embodiments, $R^2$ is benzyl.

In certain embodiments, each $R^1$ and $R^2$ are hydrogen. In some embodiments, each $R^1$ is hydrogen and each $R^2$ is other than hydrogen. In some embodiments, each $R^2$ is hydrogen each and each $R^1$ is other than hydrogen.

In certain embodiments, $R^1$ and $R^2$ are both methyl, ethyl, propyl, butyl, pentyl, hexyl, heptyl, octyl, phenyl, or benzyl. In some embodiments, $R^1$ and $R^2$ are each butyl. In some embodiments, $R^1$ and $R^2$ are each isopropyl. In some embodiments, $R^1$ and $R^2$ are each perfluoro. In some embodiments, $R^1$ and $R^2$ are $-CF_2CF_3$. In some embodiments, $R^1$ and $R^2$ are each phenyl. In some embodiments, $R^1$ and $R^2$ are each benzyl.

In some embodiments, two or more $R^1$ and $R^2$ are taken together to form one or more optionally substituted carbocyclic, heterocyclic, aryl, or heteroaryl rings. In certain embodiments, $R^1$ and $R^2$ are taken together to form a ring fragment selected from the group consisting of: $-C(R^y)_2-$, $-C(R^y)_2C(R^y)_2-$, $-C(R^y)_2C(R^y)_2C(R^y)_2-$, $-C(R^y)_2OC(R^y)_2-$, and $-C(R^y)_2NR^yC(R^y)_2-$, wherein $R^y$ is as defined above. In certain embodiments, $R^1$ and $R^2$ are taken together to form a ring fragment selected from the group consisting of: $-CH_2-$, $-CH_2CH_2-$, $-CH_2CH_2CH_2-$, $-CH_2OCH_2-$, and $-CH_2NR^yCH_2-$. In some embodiments, $R^1$ and $R^2$ are taken together to form an unsaturated ring fragment optionally containing one or more additional heteroatoms. In some embodiments, the resulting nitrogen-containing ring is partially unsaturated. In certain embodiments, the resulting nitrogen-containing ring comprises a fused polycyclic heterocycle.

In certain embodiments, $R^3$ is hydrogen. In certain embodiments, $R^3$ is optionally $C_{1-20}$ aliphatic; $C_{1-20}$ heteroaliphatic, 5- to 14-membered heteroaryl, phenyl, 8- to 10-membered aryl or 3- to 7-membered heterocyclic. In some embodiments, $R^3$ is an optionally substituted radical selected from the group consisting of a 3- to 8-membered saturated or partially unsaturated monocyclic carbocycle, a 7- to 14-membered saturated or partially unsaturated polycyclic carbocycle, a 5- to 6-membered monocyclic heteroaryl ring having 1-4 heteroatoms independently selected from nitrogen, oxygen, or sulfur; an 8- to 14-membered polycyclic heteroaryl ring having 1-5 heteroatoms independently selected from nitrogen, oxygen, or sulfur, a 3- to 8-membered saturated or partially unsaturated monocyclic heterocyclic ring having 1-3 heteroatoms independently selected from nitrogen, oxygen, or sulfur, a 6- to 14-membered saturated or partially unsaturated polycyclic heterocycle having 1-5 heteroatoms independently selected from nitrogen, oxygen, or sulfur; phenyl, or an 8- to 14-membered polycyclic aryl ring. In certain embodiments, $R^3$ is optionally substituted $C_{1-12}$ aliphatic. In some embodiments, $R^3$ is optionally substituted $C_{1-6}$ aliphatic. In certain embodiments, $R^3$ is optionally substituted phenyl.

In certain embodiments, $R^3$ is methyl, ethyl, propyl, butyl, pentyl, hexyl, heptyl, octyl, phenyl, or benzyl. In some embodiments, $R^3$ is butyl. In some embodiments, $R^3$ is isopropyl. In some embodiments, $R^3$ is perfluoro. In some embodiments, $R^3$ is —$CF_2CF_3$.

In some embodiments, two or more $R^1$ or $R^2$ groups are taken together with $R^3$ to form an optionally substituted heterocyclic or heteroaryl ring. In certain embodiments, $R^1$ and $R^3$ are taken together to form an optionally substituted 5- or 6-membered ring. In some embodiments, $R^2$ and $R^3$ are taken together to form an optionally substituted 5- or 6-membered ring optionally containing one or more additional heteroatoms. In some embodiments, $R^1$, $R^2$, and $R^3$ are taken together to form an optionally substituted fused ring system. In some embodiments, such rings formed by combinations of any of $R^1$, $R^2$ and $R^3$ are partially unsaturated or aromatic.

In certain embodiments, $R^4$ is hydrogen. In some embodiments, $R^4$ is an optionally substituted radical selected from the group consisting of $C_{1-12}$ aliphatic, phenyl, 8- to 10-membered aryl, and 3- to 8-membered heterocyclic. In certain embodiments, $R^4$ is $C_{1-12}$ aliphatic. In certain embodiments, $R^4$ is $C_{1-6}$ aliphatic. In some embodiments, $R^4$ is an optionally substituted 8- to 10-membered aryl group. In certain embodiments, $R^4$ is optionally substituted $C_{1-12}$ acyl or optionally substituted $C_{1-6}$ acyl. In certain embodiments, $R^4$ is optionally substituted phenyl. In some embodiments, $R^4$ is a hydroxyl protecting group. In some embodiments, $R^4$ is a hydroxyl protecting group containing a silyl group. In some embodiments, $R^4$ is methyl, ethyl, propyl, butyl, pentyl, hexyl, heptyl, octyl, allyl, phenyl, or benzyl.

In certain embodiments, $R^1$ and $R^4$ are taken together with intervening atoms to form one or more optionally substituted heterocyclic or heteroaryl rings optionally containing one or more additional heteroatoms.

In some embodiments, an activating functional group is an N-linked amino group. In some embodiments, an activating functional group is an N-linked amino group of the formula:

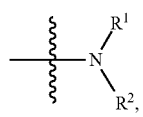

wherein $R^1$ and $R^2$ are as defined above and described in classes and subclasses herein, both singly and in combination.

In some embodiments, an N-linked amino activating functional group is selected from the group consisting of:

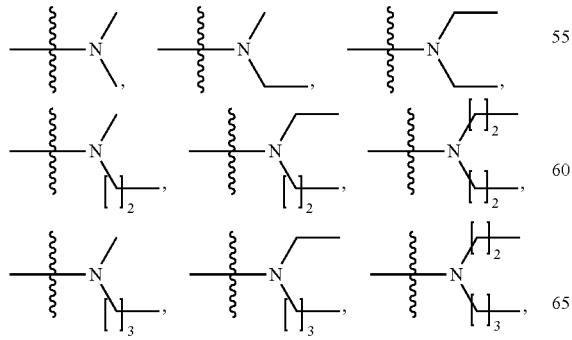

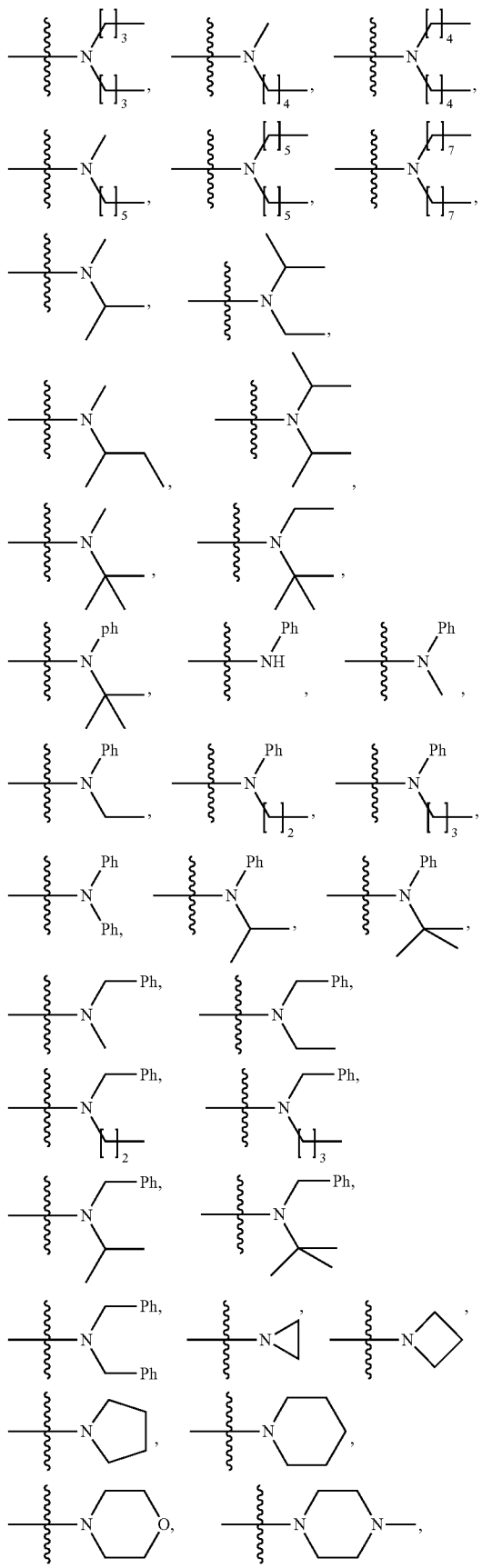

-continued

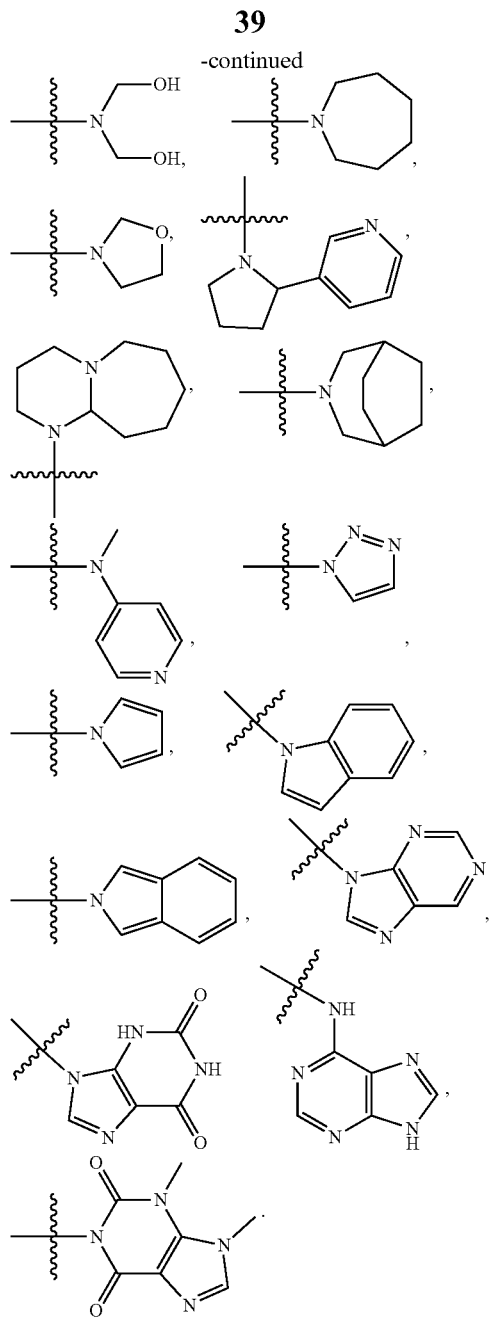

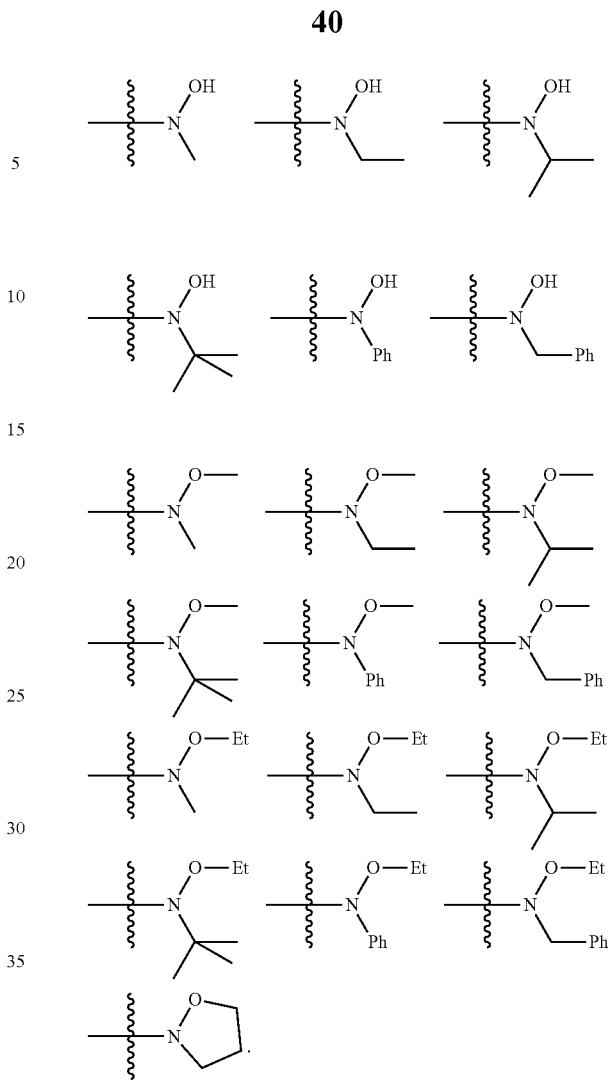

In some embodiments, an activating functional group is an N-linked hydroxyl amine. In some embodiments, an activating functional group is an N-linked hydroxyl amine of the formula:

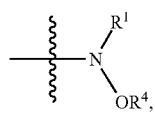

wherein $R^1$ and $R^4$ are as defined above and described in classes and subclasses herein, both singly and in combination. In certain embodiments, one or more N-linked hydroxyl amine activating functional groups are selected from the group consisting of:

In some embodiments, an activating functional group is an amidine. In some embodiments, an activating functional group is an amidine is selected from the group consisting of:

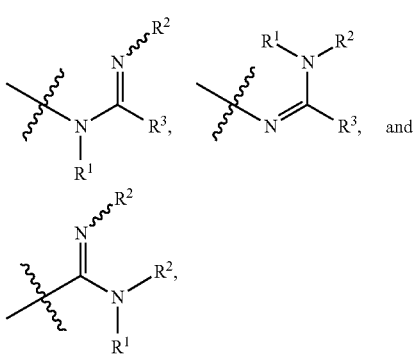

wherein each of $R^1$, $R^2$, and $R^3$ is as defined above and described in classes and subclasses herein, both singly and in combination. In some embodiments, an activating functional group is an N-linked amidine. In some embodiments, an activating functional group is an N-linked amidine of the formula:

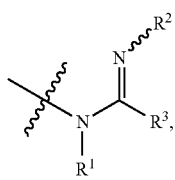

wherein each of $R^1$, $R^2$, and $R^3$ is as defined above and described in classes and subclasses herein, both singly and in combination. In certain embodiments, such N-linked amidine groups are selected from the group consisting of:

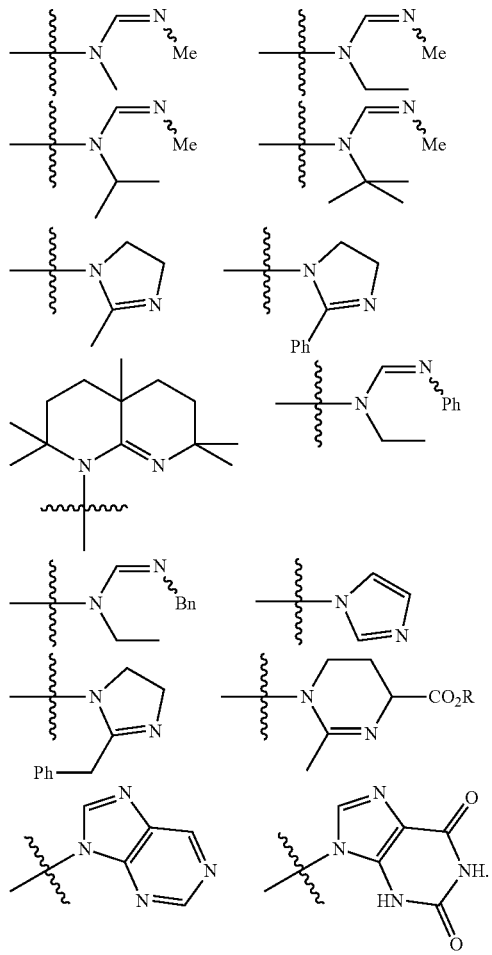

In some embodiments, an activating functional group is an amidine moiety linked through the imine nitrogen. In some embodiments, an activating functional group is an amidine moiety linked through the imine nitrogen and of the formula:

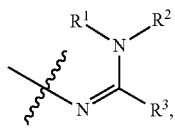

wherein each of $R^1$, $R^2$, and $R^3$ is as defined above and described in classes and subclasses herein. In certain embodiments, such imine-linked amidine activating functional groups are selected from the group consisting of:

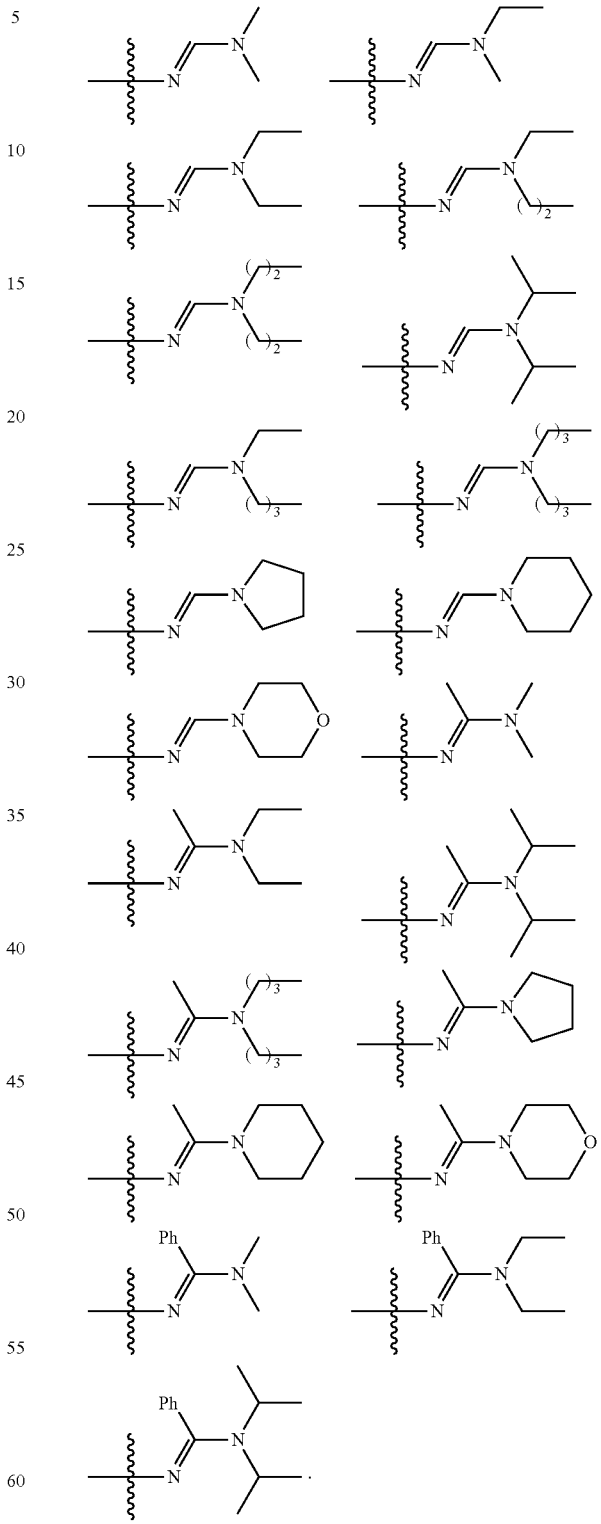

In some embodiments, an activating functional group is an amidine moiety linked through a carbon atom. In some embodiments, an activating functional group is an amidine moiety linked through a carbon atom and of the formula:

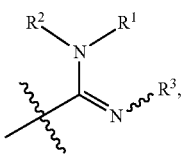

wherein each of $R^1$, $R^2$, and $R^3$ is as defined above and described in classes and subclasses herein, both singly and in combination. In certain embodiments, such carbon-linked amidine activating groups are selected from the group consisting of:

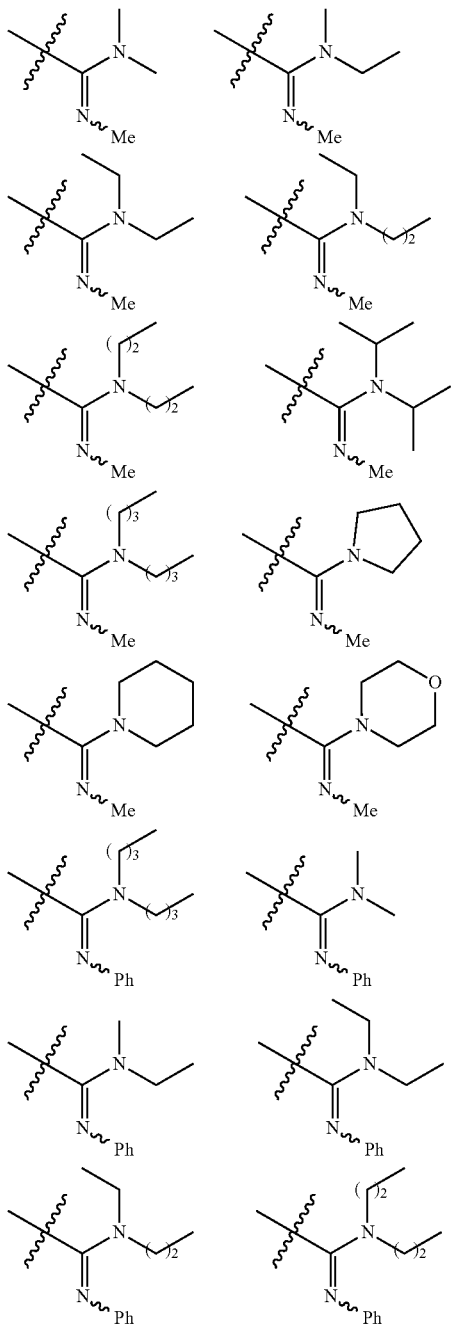

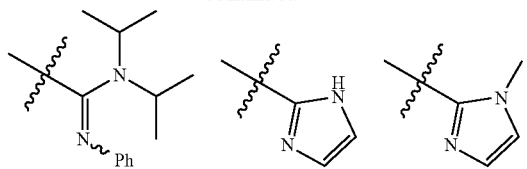

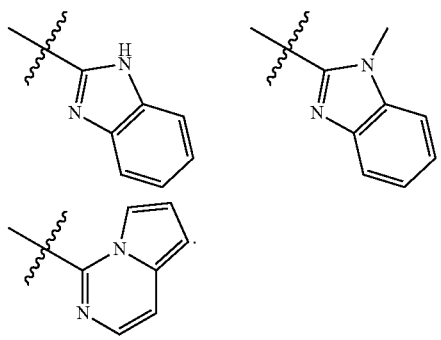

In some embodiments, an activating functional group is a carbamate. In some embodiments, an activating functional group is a N-linked carbamate. In some embodiments, an activating functional group is a N-linked carbamate of the formula:

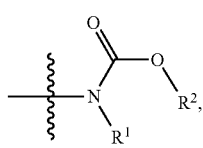

wherein each of $R^1$ and $R^2$ is as defined above and described in classes and subclasses herein, both singly and in combination.

In some embodiments, an activating functional group is a O-linked carbamate In some embodiments, an activating functional group is a O-linked carbamate of the formula:

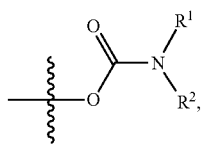

wherein each of $R^1$ and $R^2$ is as defined above and described in classes and subclasses herein, both singly and in combination.

In some embodiments of such carbamates, $R^2$ is selected from the group consisting of: methyl, t-butyl, t-amyl, benzyl, adamantyl, allyl, 4-methoxycarbonylphenyl, 2-(methyl sulfonyl)ethyl, 2-(4-biphenylyl)-prop-2-yl, 2-(trimethylsilyl)ethyl, 2-bromoethyl, and 9-fluorenylmethyl.

In some embodiments, an activating functional group is a guanidine or bis-guanidine group. In some embodiments, an activating functional group is a guanidine or bis-guanidine selected from the group consisting of:

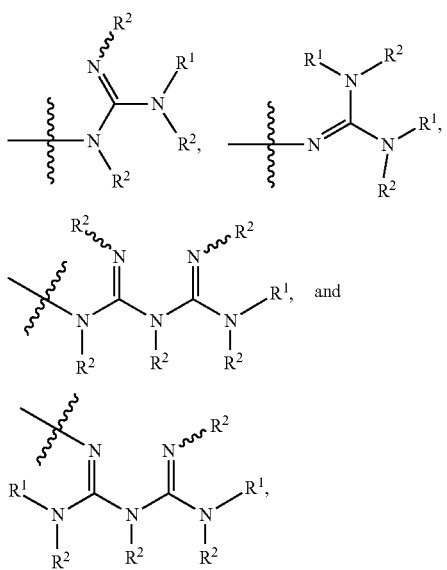

wherein each R[1] and R[2] is as defined above and described in classes and subclasses herein, both singly and in combination. In some embodiments of such guanidines or bis-guanidines, any two or more R[1] or R[2] groups are taken together with intervening atoms to form one or more optionally substituted carbocyclic, heterocyclic, aryl, or heteroaryl rings. In certain embodiments, R[1] and R[2] groups are taken together to form an optionally substituted 5- or 6-membered ring. In some embodiments, three or more R[1] and/or R[2] groups are taken together to form an optionally substituted fused polycyclic heterocycle ring system. In certain embodiments, where an activating functional group is a guanidine or bis guanidine moiety, it is selected from the group consisting of:

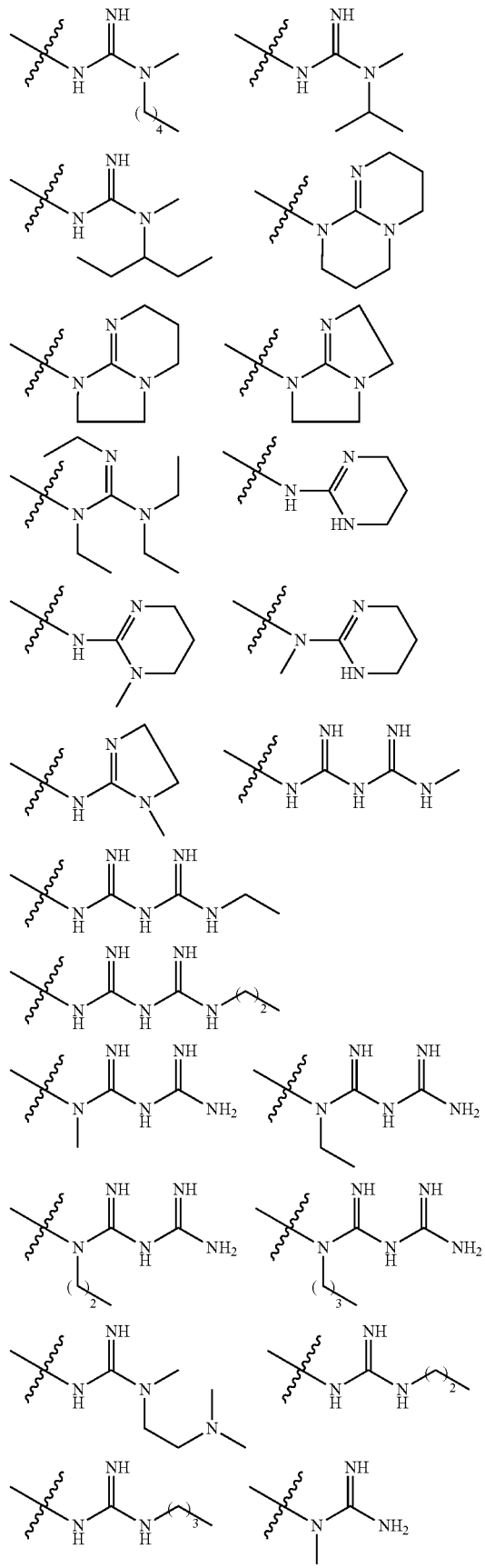

-continued

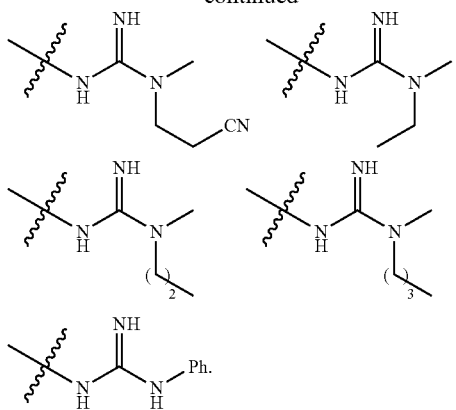

In some embodiments, an activating functional group is a urea. In some embodiments, an activating functional group is a urea of the formula:

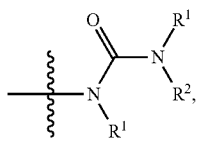

wherein each $R^1$ and $R^2$ is independently as defined above and described in classes and subclasses herein, both singly and in combination.

In some embodiments, an activating functional group is an oxime or hydrazone group. In some embodiments, an activating functional group an oxime or hydrazone group of the formula:

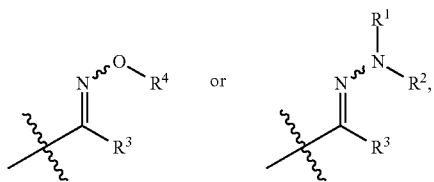

wherein each of $R^1$, $R^2$, $R^3$, and $R^4$ is as defined above and described in classes and subclasses herein, both singly and in combination.

In some embodiments, an activating functional group is a N-oxide derivative. In some embodiments, an activating functional group is a N-oxide derivative is of the formula:

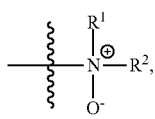

wherein each of $R^1$ and $R^2$ is as defined above and described in classes and subclasses herein, both singly and in combination. In certain embodiments, an N-oxide activating functional group is selected from the group consisting of:

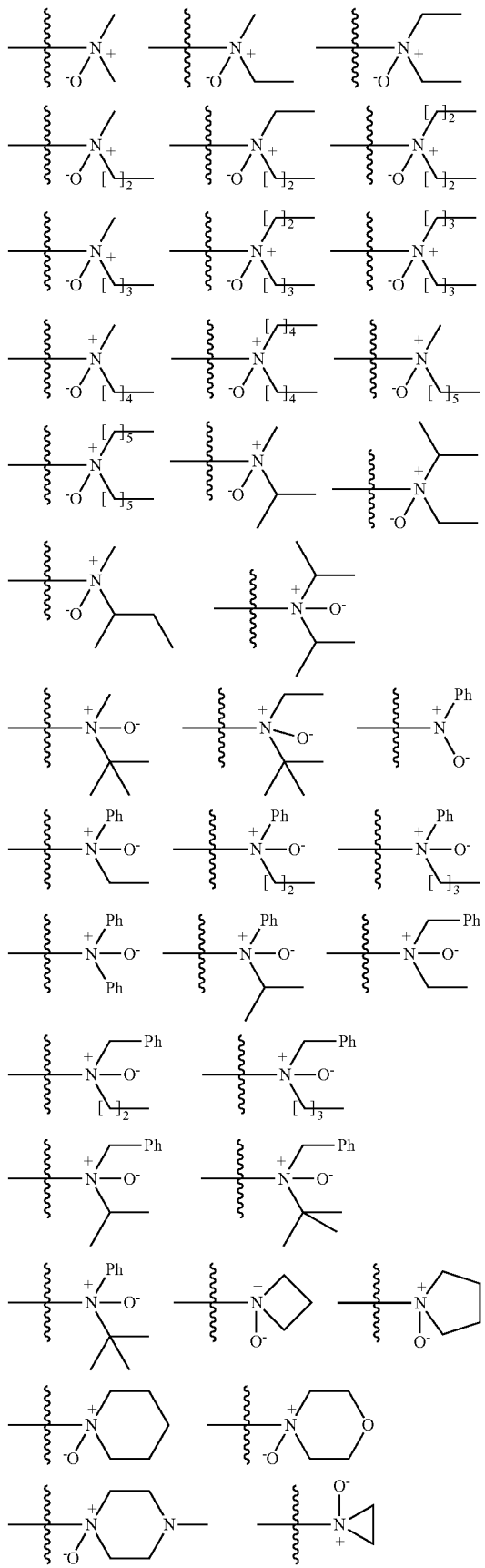

-continued
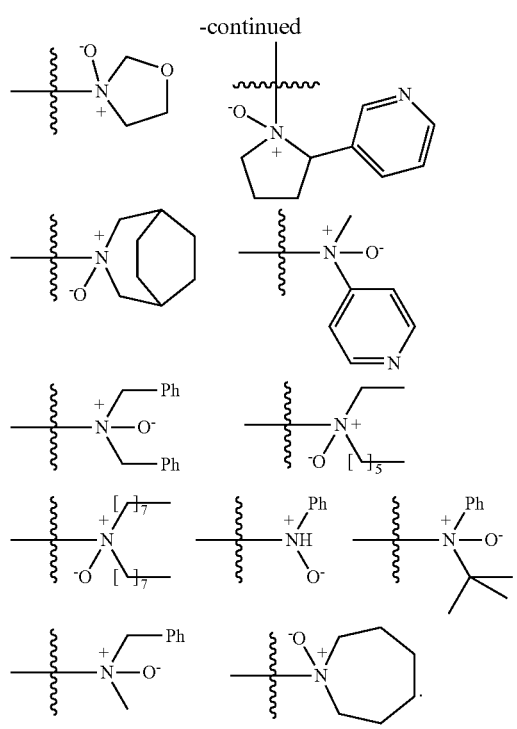
Cationic Activating Groups
In some embodiments, one or more tethered activating functional groups on provided metal complexes comprise a cationic moiety. In some embodiments, a cationic moiety is selected from a structure in Table Z-2:
TABLE Z-2
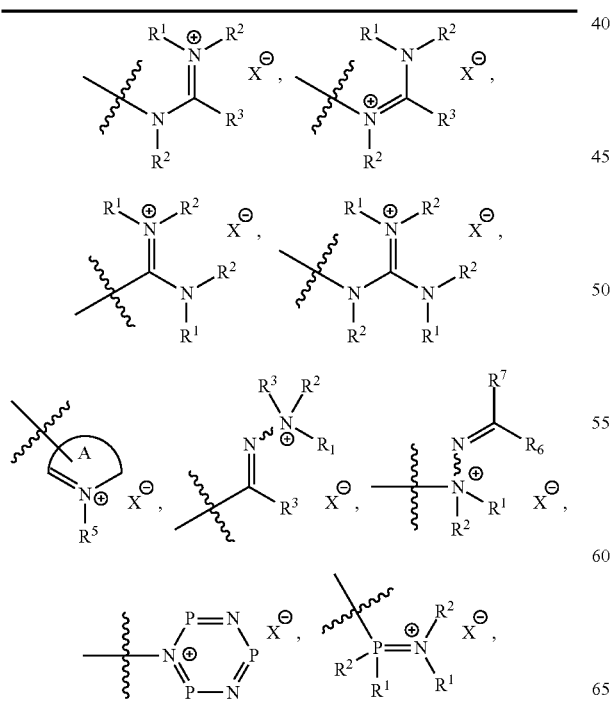
TABLE Z-2-continued
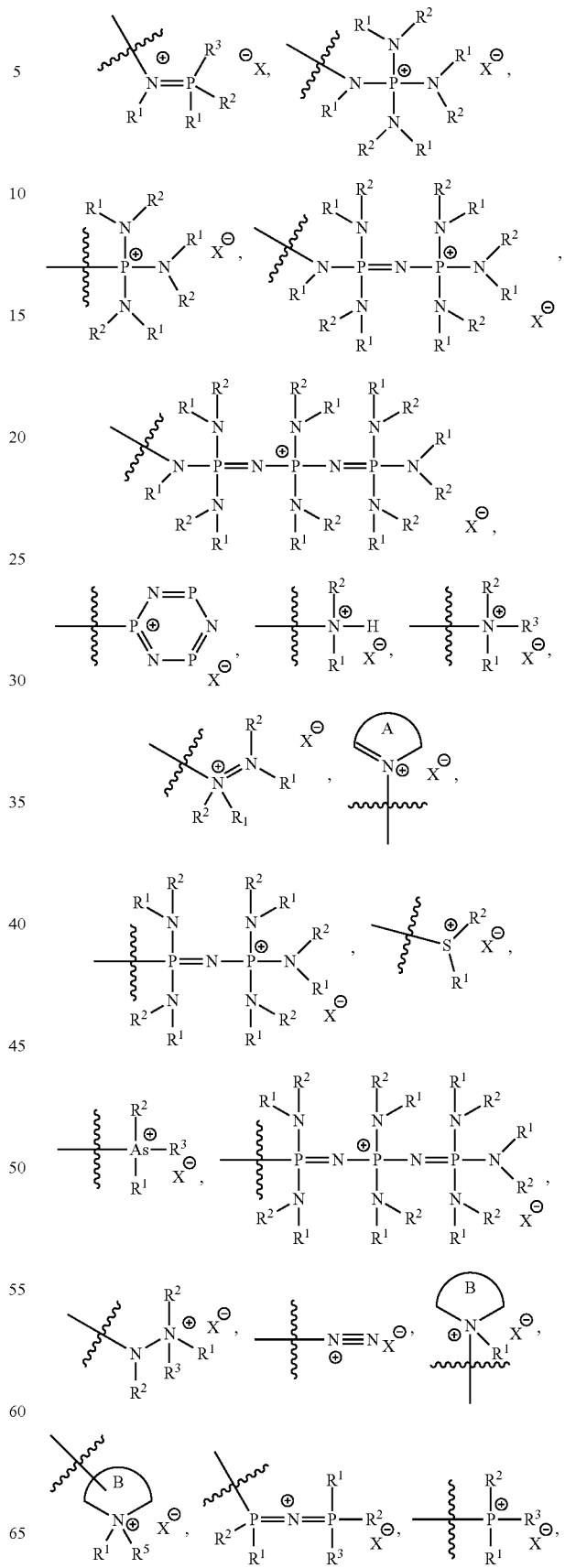

TABLE Z-2-continued

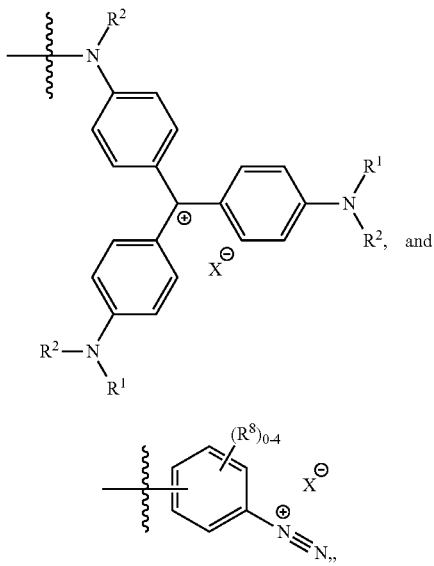

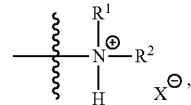

wherein:
each of $R^1$, $R^2$, and $R^3$ is independently as defined above and described in classes and subclasses herein, both singly and in combination;
$R^5$ is $R^2$ or hydroxyl; wherein $R^1$ and $R^5$ can be taken together to form one or more optionally substituted carbocyclic, heterocyclic, aryl, or heteroaryl rings;
each $R^6$ and $R^7$ is independently hydrogen or an optionally substituted radical selected from the group consisting of $C_{1-20}$ aliphatic; $C_{1-20}$ heteroaliphatic; a 3- to 8-membered saturated or partially unsaturated monocyclic carbocycle; a 7- to 14-membered saturated or partially unsaturated polycyclic carbocycle; a 5- to 6-membered monocyclic heteroaryl ring having 1-4 heteroatoms independently selected from nitrogen, oxygen, or sulfur; an 8- to 14-membered polycyclic heteroaryl ring having 1-5 heteroatoms independently selected from nitrogen, oxygen, or sulfur; a 3- to 8-membered saturated or partially unsaturated monocyclic heterocyclic ring having 1-3 heteroatoms independently selected from nitrogen, oxygen, or sulfur; a 6- to 14-membered saturated or partially unsaturated polycyclic heterocycle having 1-5 heteroatoms independently selected from nitrogen, oxygen, or sulfur; phenyl; or an 8- to 14-membered polycyclic aryl ring; wherein $R^6$ and $R^7$ can be taken together to form one or more optionally substituted rings optionally containing one or more heteroatoms, and an $R^6$ and $R^7$ group can be taken with an $R^1$ or $R^2$ group to form one or more optionally substituted rings;
each occurrence of $R^8$ is independently selected from the group consisting of: halogen, —$NO_2$, —CN, —$SR^y$, —$S(O)R^y$, —$S(O)_2R^y$, —$NR^yC(O)R^y$, —$OC(O)R^y$, —$CO_2R^y$, —NCO, —$N_3$, —$OR^7$, —$OC(O)N(R^y)_2$, —$N(R^3)_2$, —$NR^yC(O)R^y$, —$NR^yC(O)OR^y$; or an optionally substituted radical selected from the group consisting of $C_{1-20}$ aliphatic; $C_{1-20}$ heteroaliphatic; a 3- to 8-membered saturated or partially unsaturated monocyclic carbocycle; a 7- to 14-membered saturated or partially unsaturated polycyclic carbocycle; a 5- to 6-membered monocyclic heteroaryl ring having 1-4 heteroatoms independently selected from nitrogen, oxygen, or sulfur; an 8- to 14-membered polycyclic heteroaryl ring having 1-5 heteroatoms independently selected from nitrogen, oxygen, or sulfur; a 3- to 8-membered saturated or partially unsaturated monocyclic heterocyclic ring having 1-3 heteroatoms independently selected from nitrogen, oxygen, or sulfur; a 6- to 14-membered saturated or partially unsaturated polycyclic heterocycle having 1-5 heteroatoms independently selected from nitrogen, oxygen, or sulfur; phenyl; or an 8- to 14-membered polycyclic aryl ring; wherein each $R^y$ is independently as defined above and described in classes and subclasses herein, both singly and in combination, and where two or more adjacent $R^8$ groups can be taken together to form an optionally substituted saturated, partially unsaturated, or aromatic 5- to 12-membered ring containing 0 to 4 heteroatoms;
$X^-$ is any anion;
Ring A is an optionally substituted, 5- to 10-membered heteroaryl group; and
Ring B is an optionally substituted, 3- to 8-membered saturated or partially unsaturated monocyclic heterocyclic ring having 0-2 heteroatoms in addition to the depicted ring nitrogen atom independently selected from nitrogen, oxygen, or sulfur.

It will be appreciated that when $X^-$ is present as a counterion to a cationic activating group, such X may be the same or different as an X bonded to the metal atom of the metal complex.

In some embodiments, an activating functional group is a protonated amine. In some embodiments, an activating functional group is a protonated amine of the formula:

$$\begin{array}{c} R^1 \\ | \\ -N^{\oplus}-R^2 \\ | \\ H \quad X^{\ominus}, \end{array}$$

wherein each of $R^1$ and $R^2$ is as defined above and described in classes and subclasses herein, both singly and in combination. In some embodiments, a protonated amine activating functional group is selected from the group consisting of:

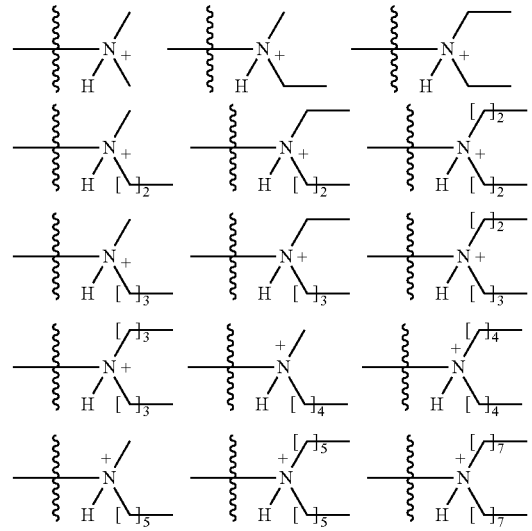

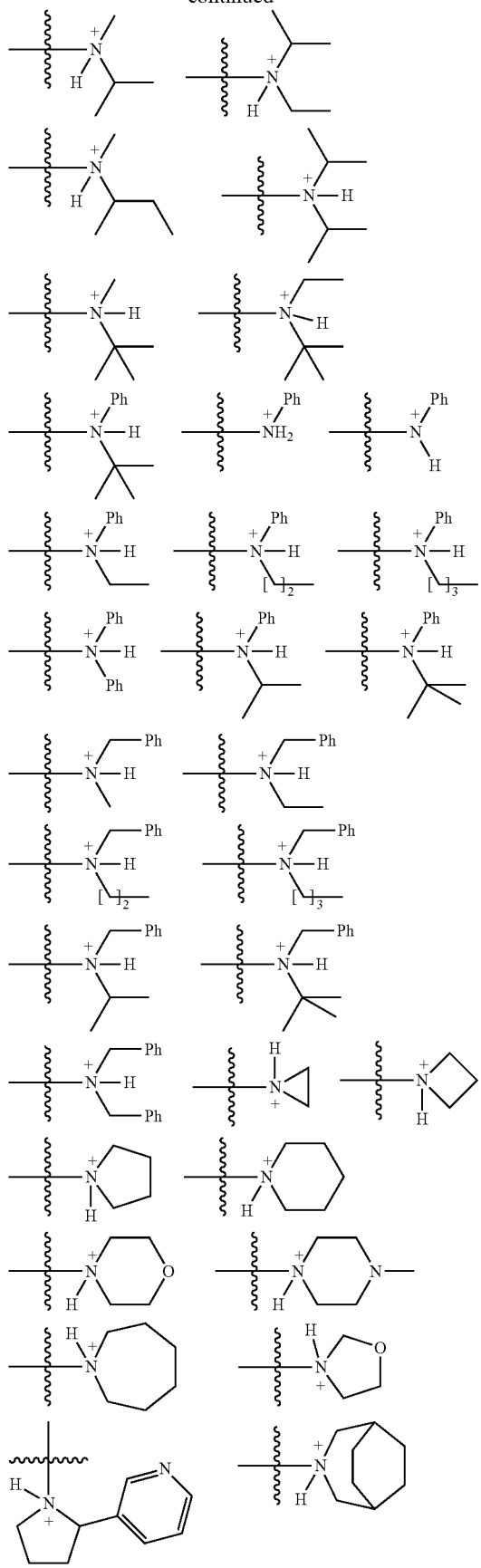

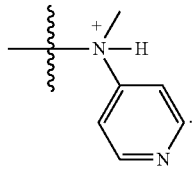

In some embodiments, an activating functional group is a quaternary amine. In some embodiments, an activating functional group is a quaternary amine of the formula:

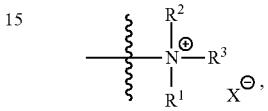

wherein each of $R^1$, $R^2$, and $R^3$ is as defined above and described in classes and subclasses herein, both singly and in combination. In some embodiments of such quaternary amines, $R^1$, $R^2$, and $R^3$ are $C_1$-$C_6$ alkyl. In some embodiments, $R^1$, $R^2$, and $R^3$ are t-butyl. In some embodiments, $R^1$, $R^2$, and $R^3$ are sec-butyl. In some embodiments, $R^1$, $R^2$, and $R^3$ are n-butyl. In some embodiments, $R^1$, $R^2$, and $R^3$ are i-propyl. In some embodiments, $R^1$, $R^2$, and $R^3$ are n-propyl. In some embodiments, $R^1$, $R^2$, and $R^3$ are ethyl. In some embodiments, $R^1$, $R^2$, and $R^3$ are methyl.

In some embodiments, an activating functional group is a guanidinium group. In some embodiments, an activating group is a guanidinium group of the formula:

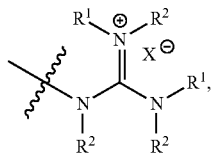

wherein each $R^1$ and $R^2$ is independently as defined above and described in classes and subclasses herein, both singly and in combination. In some embodiments of such guanidiniums, each $R^1$ and $R^2$ is independently hydrogen or $C_{1-20}$ aliphatic. In some embodiments, each $R^1$ and $R^2$ is independently hydrogen or $C_{1-12}$ aliphatic. In some embodiments, each $R^1$ and $R^2$ is independently hydrogen or $C_{1-20}$ heteroaliphatic. In some embodiments, each $R^1$ and $R^2$ is independently hydrogen or phenyl. In some embodiments, each $R^1$ and $R^2$ is independently hydrogen or 8- to 10-membered aryl. In some embodiments, each $R^1$ and $R^2$ is independently hydrogen or 5- to 10-membered heteroaryl. In some embodiments, each $R^1$ and $R^2$ is independently hydrogen or 3- to 7-membered heterocyclic. In some embodiments, one or more of $R^1$ and $R^2$ is optionally substituted $C_{1-12}$ aliphatic. In some embodiments, any two or more $R^1$ or $R^2$ groups are taken together to form one or more optionally substituted carbocyclic, heterocyclic, aryl, or heteroaryl rings. In certain embodiments, $R^1$ and $R^2$ groups are taken together to form an optionally substituted 5- or 6-membered ring. In some embodiments, three or more $R^1$ and/or $R^2$ groups are taken together to form an optionally substituted fused polycyclic heterocyclic ring system. In certain embodiments, a $R^1$ and $R^2$ group are taken together with intervening atoms to form a group selected from:

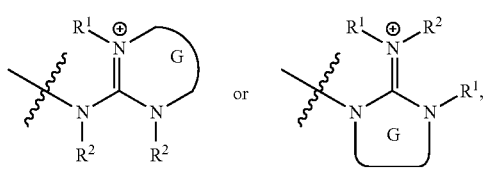 or 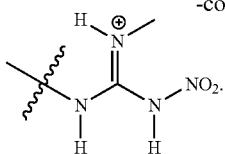

wherein each R¹ and R² is independently as defined above and described in classes and subclasses herein, both singly and in combination, and Ring G is an optionally substituted 5- to 7-membered saturated or partially unsaturated heterocyclic ring.

In some embodiments, a guanidinium activating functional group is selected from the group consisting of:

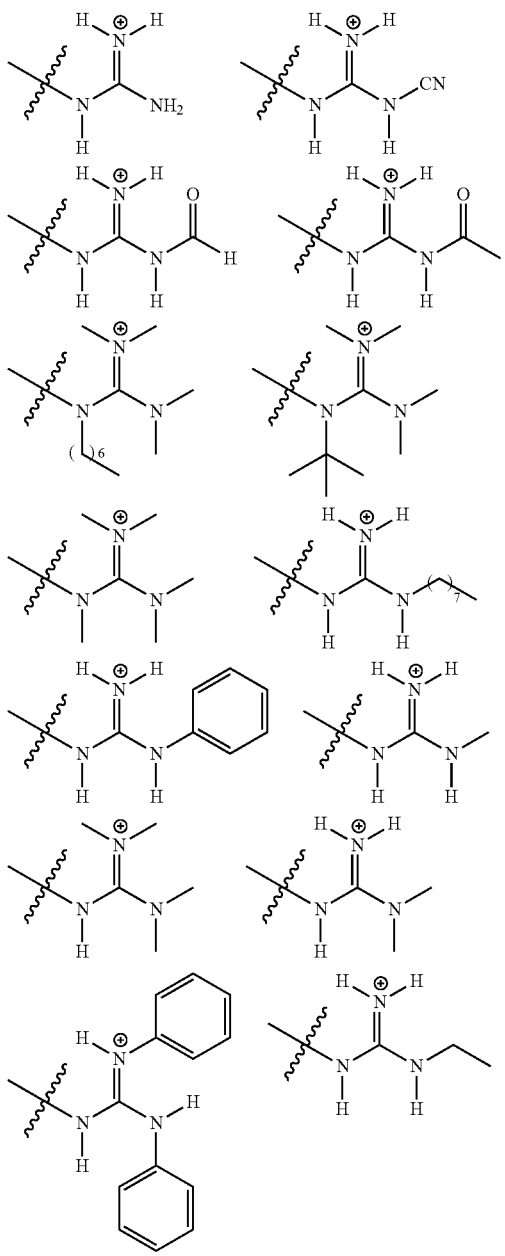

In some embodiments, an activating functional group is a cationic bicyclic guanidinium group, wherein the cationic bicyclic guanidinium group has no free amines. In some embodiments, a guanidinium group having no free amines has two nitrogen atoms each bearing three nonhydrogen substituents and a third nitrogen atom with bonds to four nonhydrogen substituents. In some embodiments, such nonhydrogen substituents are aliphatic substituents. In some embodiments, a guanidinium group having no free amines is cationic, as compared to a neutral guanidinium group having a free amine.

It will be appreciated that when a guanidinium cation is drawn in a particular fashion herein, all resonance or tautomeric forms are contemplated and encompassed by the present disclosure. For example, the group:

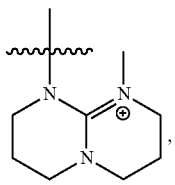 [SMILES: *N1CCCN2CCC[N+](C)=C12]

may also be depicted as

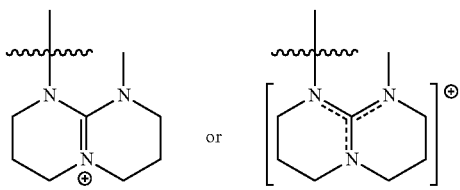

In certain embodiments, an activating functional group is selected from the group consisting of:

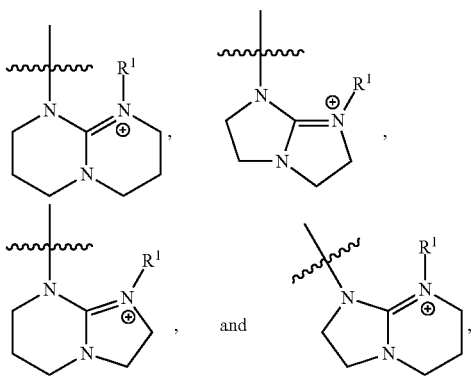

wherein R¹ is as defined above and described in classes and subclasses herein, both singly and in combination. In some embodiments, R¹ is methyl and the activating functional group is selected from the group consisting of:

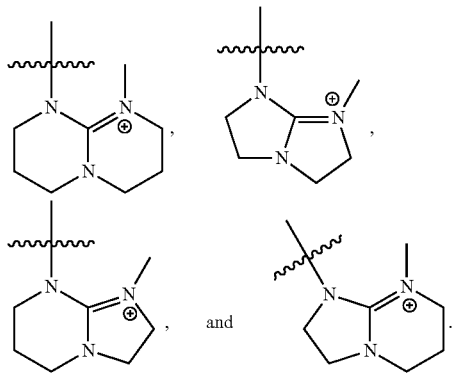

In some embodiments, an activating function group is an amidinium group. In some embodiments, an activating functional group is an amidinium group of the formula:

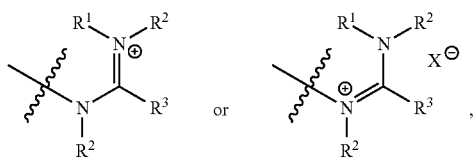

wherein each R¹, R², and R³ is independently as defined above and described in classes and subclasses herein, both singly and in combination. In some embodiments, an activating functional group an amidinium group of the formula:

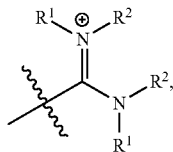

wherein each R¹ and R² is independently as defined above and described in classes and subclasses herein, both singly and in combination.

In some embodiments, an activating functional group is a cationic bicyclic amidinium group, wherein the cationic bicyclic amidinium group has no free amines. In some embodiments, an amidinium group having no free amines has one nitrogen atom bearing three nonhydrogen substituents and a second nitrogen atom with bonds to four nonhydrogen substituents. In some embodiments, such nonhydrogen substituents are aliphatic substituents. In some embodiments, such nonhydrogen substituents comprise the rings of the bicyclic amidinium group. In some embodiments, an amidinium group having no free amines is cationic, as compared to a neutral amidinium group having a free amine.

It will be appreciated that when an amidinium cation is drawn in a particular fashion herein, all resonance forms are contemplated and encompassed by the present disclosure. For example, the group:

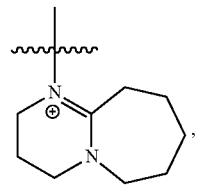 [SMILES: *[N+]1=C2CCCCCN2CCC1]

may also be depicted as

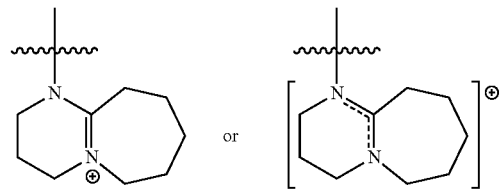

In certain embodiments, the activating functional group is an amidinium group selected from the group consisting of:

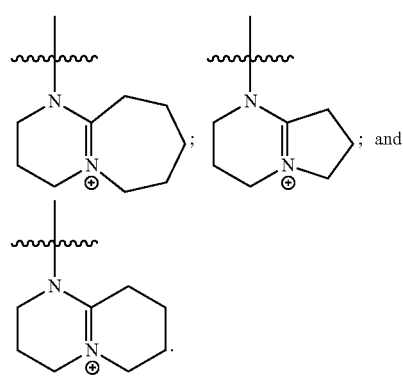

In some embodiments, an activating functional group is or comprises an optionally substituted nitrogen-containing heterocycle or heteroaryl. In certain embodiments, the nitrogen-containing heterocycle is heteroaryl. In certain embodiments, an optionally substituted nitrogen-containing heterocycle is selected from the group consisting of: pyridine, imidazole, pyrrolidine, pyrazole, quinoline, thiazole, dithiazole, oxazole, triazole, pyrazolem, isoxazole, isothiazole, tetrazole, pyrazine, thiazine, and triazine.

In certain embodiments, an optionally substituted nitrogen-containing heterocycle or heteroaryl is selected from the group consisting of pyridinium, imidazolium, pyrrolidinium, pyrazolium, quinolinium, thiazolium, dithiazolium, oxazolium, triazolium, isoxazolium, isothiazolium, tetrazolium, pyrazinium, thiazinium, and triazinium.

In certain embodiments, a nitrogen-containing heterocycle or heteroaryl is linked to a metal complex via a ring nitrogen atom. In some embodiments, a ring nitrogen to which the attachment is made is thereby quaternized, and in some embodiments, linkage to a metal complex takes the place of an N—H bond and the nitrogen atom thereby remains neutral. In certain embodiments, an optionally substituted N-linked nitrogen-containing heteroaryl is a pyridinium derivative. In certain embodiments, an optionally substituted N-linked nitrogen-containing heteroaryl is an imidazolium derivative. In certain embodiments, an optionally substituted N-linked nitrogen-containing heteroaryl is a thiazolium derivative. In certain embodiments, an optionally substituted N-linked nitrogen-containing heteroaryl is a oxazolium derivative.

In some embodiments, a nitrogen-containing heterocycle or heteroaryl includes a quaternarized nitrogen atom. In certain embodiments, a nitrogen-containing heterocycle includes an iminium moiety such as

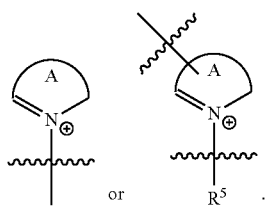

In some embodiments, an activating functional group is

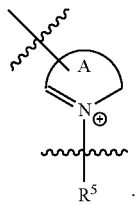

In certain embodiments, ring A is an optionally substituted, 5- to 10-membered heteroaryl group. In some embodiments, Ring A is an optionally substituted, 6-membered heteroaryl group. In some embodiments, Ring A is a ring of a fused heterocycle. In some embodiments, Ring A is an optionally substituted pyridyl group.

In some embodiments, a nitrogen-containing heterocycle or heteroaryl activating functional group is selected from the group consisting of:

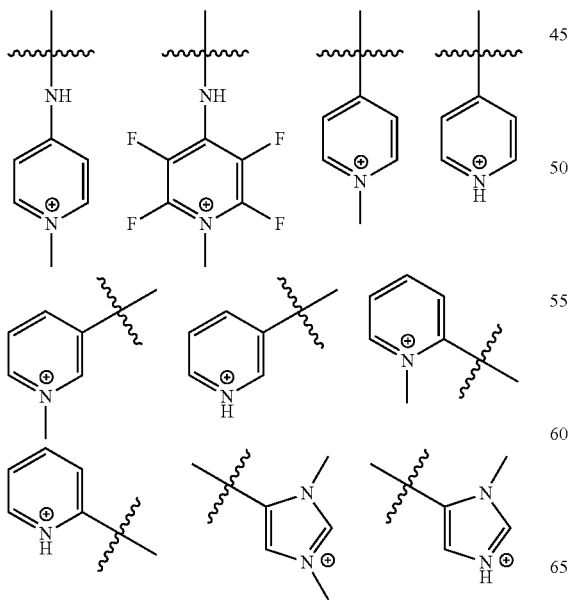

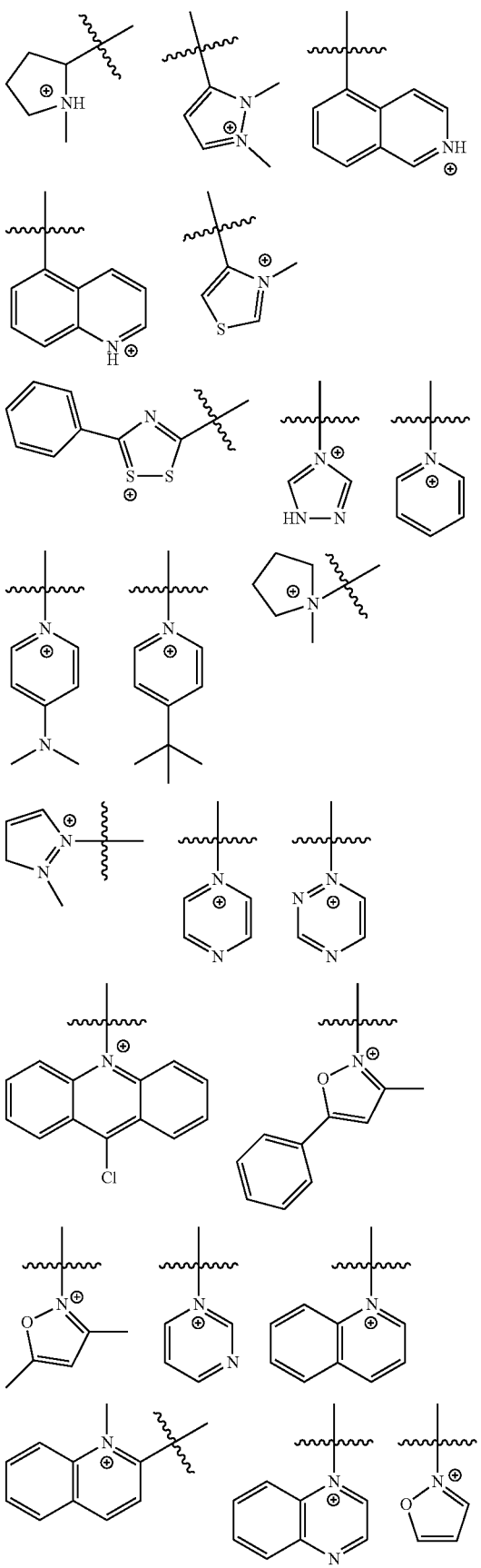

-continued

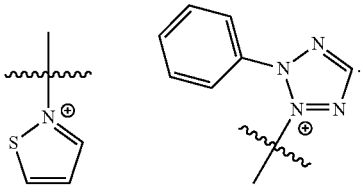

In certain embodiments, Ring B is a 5-membered saturated or partially unsaturated monocyclic heterocyclic ring. In certain embodiments, Ring B is a 6-membered saturated or partially unsaturated heterocycle. In certain embodiments, Ring B is a 7-membered saturated or partially unsaturated heterocycle. In certain embodiments, Ring B is tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. In some embodiments, Ring B is piperidinyl.

In some embodiments, an activating functional group is

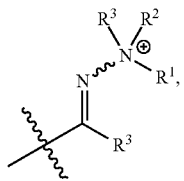

wherein each $R^1$, $R^2$, and $R^3$ is independently as defined above and described in classes and subclasses herein, both singly and in combination.

In some embodiments, an activating functional group is

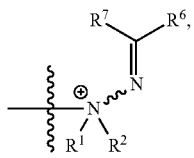

wherein each of $R^1$, $R^2$, $R^6$, and $R^7$ is as defined above and described in classes and subclasses herein, both singly and in combination.

In some embodiments, an activating functional group is

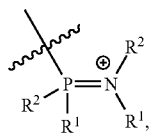

wherein each $R^1$ and $R^2$ is independently as defined above and described in classes and subclasses herein, both singly and in combination.

In some embodiments, an activating functional group is

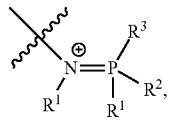

wherein each $R^1$, $R^2$, and $R^3$ is independently as defined above and described in classes and subclasses herein, both singly and in combination.

In some embodiments, an activating functional group is

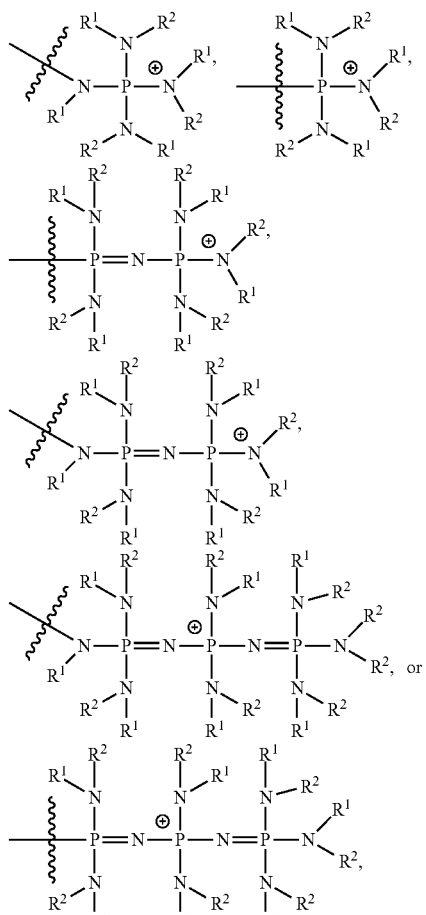

wherein each $R^1$ and $R^2$ is independently as defined above and described in classes and subclasses herein, both singly and in combination.

In some embodiments, an activating functional group is

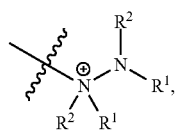

wherein each $R^1$ and $R^2$ is independently as defined above and described in classes and subclasses herein, both singly and in combination.

In some embodiments, an activating functional group is

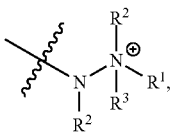

wherein each $R^1$, $R^2$, and $R^3$ is independently as defined above and described in classes and subclasses herein, both singly and in combination.

In some embodiments, an activating functional group is

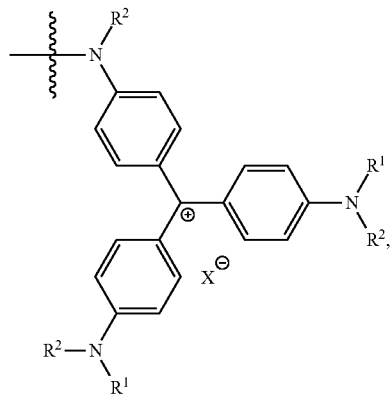

wherein each $R^1$ and $R^2$ is independently as defined above and described in classes and subclasses herein, both singly and in combination.

In some embodiments, an activating functional group is a sulfonium group or an arsonium group. In some embodiments, an activating functional group is a sulfonium group or an arsonium group of the formula:

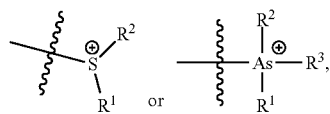

wherein each of $R^1$, $R^2$, and $R^3$ are as defined above and described in classes and subclasses herein, both singly and in combination. In some embodiments, an arsonium activating functional group is selected from the group consisting of:

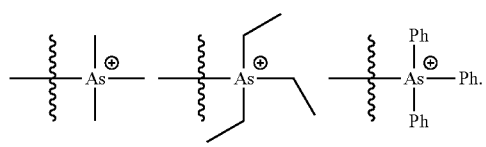

Phosphorous-Containing Activating Groups

In some embodiments, activating functional groups Z are phosphorous containing groups. In certain embodiments, a phosphorous-containing functional group is chosen from the group consisting of: phosphines (—$PR^y{}_2$); Phosphine oxides (—$P(O)R^y{}_2$); phosphinites (—$P(OR^4)R^y{}_2$); phosphonites (—$P(OR^4)_2R^y$); phosphites (—$P(OR^4)_3$); phosphinates (—$OP(OR^4)R^y{}_2$); phosphonates; (—$OP(OR^4)_2R^y$); phosphates (—$OP(OR^4)_3$); and phosphonium salts ($[$—$PR^y{}_3]^+$) where a phosphorous-containing functional group may be linked to a metal complex through any available position (e.g. direct linkage via the phosphorous atom, or in some cases via an oxygen atom).

In certain embodiments, a phosphorous-containing functional group is chosen from the group consisting of:

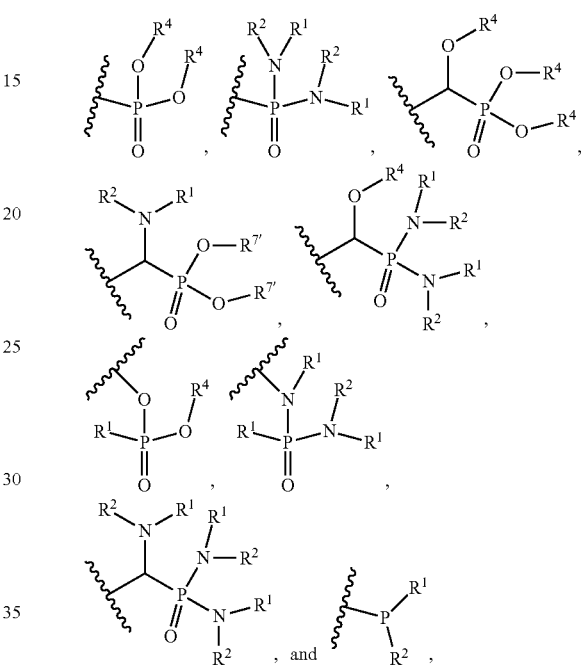

wherein each $R^1$, $R^2$, and $R^4$ is as defined above and described in classes and subclasses herein, both singly and in combination; and where two $R^4$ groups can be taken together with intervening atoms to form an optionally substituted ring optionally containing one or more heteroatoms, or an $R^4$ group can be taken with an $R^1$ or $R^2$ group to an optionally substituted carbocyclic, heterocyclic, heteroaryl, or aryl ring.

In some embodiments, phosphorous-containing functional groups include those disclosed in *The Chemistry of Organophosphorus Compounds. Volume 4. Ter- and Quinquevalent Phosphorus Acids and their Derivatives.* The Chemistry of Functional Group Series Edited by Frank R. Hartley (Cranfield University, Cranfield, U.K.). Wiley: New York. 1996. ISBN 0-471-95706-2, the entirety of which is hereby incorporated herein by reference.

In certain embodiments, phosphorous-containing functional groups have the formula:

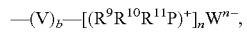

wherein:
V is —O—, —N=, or —$NR^z$—;
b is 1 or 0;
each of $R^9$, $R^{10}$ and $R^{11}$ are independently present or absent and, if present, are independently selected from the group consisting of optionally substituted $C_1$-$C_{20}$ aliphatic, optionally substituted phenyl, optionally substituted $C_8$-$C_{14}$ aryl, optionally substituted 3- to 14-membered heterocyclic, optionally substituted 5- to 14-membered heteroaryl, halogen, =O, —OR$^z$, =NR$^z$ and N(R$^z$)$_2$ where R$^z$ is hydrogen, or an optionally substituted C$_1$-C$_{20}$ aliphatic, optionally substituted phenyl, optionally substituted 8- to 14-membered aryl, optionally substituted 3- to 14-membered heterocyclic, or optionally substituted 5- to 14-membered heteroaryl;

W is any anion; and n is an integer between 1 and 4.

In certain embodiments, an activating functional group is a phosphonate group. In some embodiments, an activating functional group is a phosphonate group selected from the group consisting of:

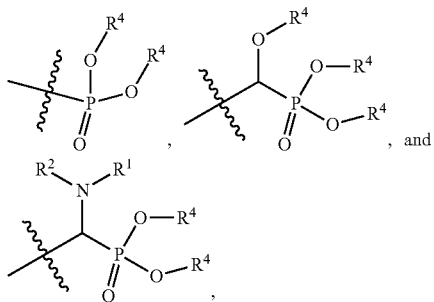

wherein each R$^1$, R$^2$, and R$^4$ is independently as defined above and described in classes and subclasses herein, both singly and in combination. In specific embodiments, a phosphonate activating functional group is selected from the group consisting of:

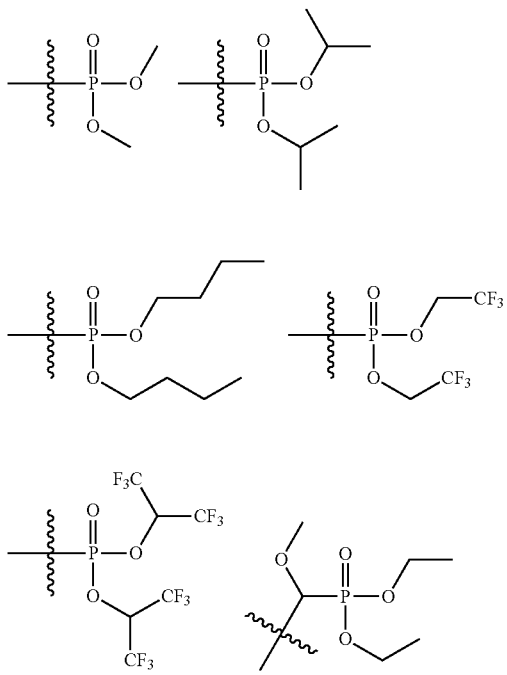

In some embodiments, an activating functional group is a phosphonic diamide group. In some embodiments, an activating functional group is a phosphonic diamide group selected from the group consisting of:

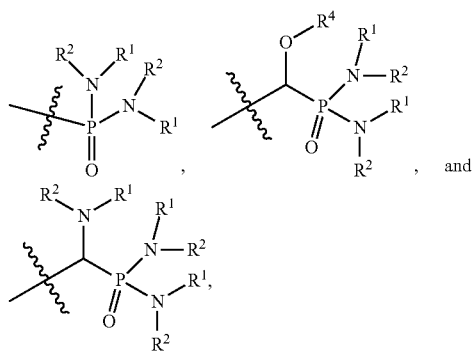

wherein each R$^1$, R$^2$, and R$^4$ is independently as defined above and described in classes and subclasses herein, both singly and in combination. In certain embodiments, each R$^1$ and R$^2$ group in a phosphonic diamide is methyl.

In some embodiments, an activating functional group is a phosphine group. In some embodiments, an activating functional group is a phosphine group of the formula:

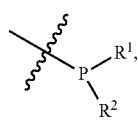

wherein R$^1$ and R$^2$ are as defined above and described in classes and subclasses herein, both singly and in combination. In some embodiments, a phosphine activating functional group is selected from the group consisting of:

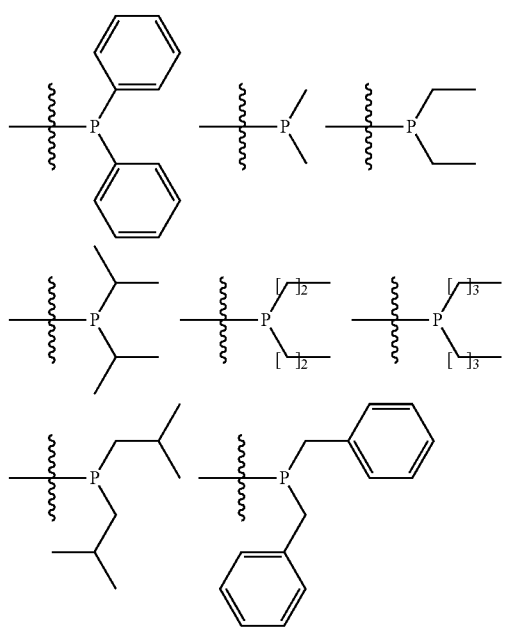

Methods of Use

In some embodiments, provided metal complexes are useful for the polymerization of epoxides and carbon dioxide. In some embodiments, the present invention provides a method comprising the step of contacting an epoxide or mixture of epoxides and carbon dioxide with a provided metal complex to form a polycarbonate polymer composition.

In certain embodiments, the present invention provides a method comprising the steps of:

i. contacting an epoxide and carbon dioxide with a metal complex to form a polycarbonate polymer composition; and ii. performing chromatography, filtration, or precipitation to obtain isolated polycarbonate polymer composition.

In some embodiments, the present invention provides methods for synthesizing cyclic carbonates from carbon dioxide and epoxides using catalysts described above. Suitable methods of performing this reaction are disclosed in U.S. Pat. No. 6,870,004 which is incorporated herein by reference.

EXAMPLES

Example 1

This example describes the synthesis of an aminodiphenylmethane used in the synthesis of a ligand for a metal complex.

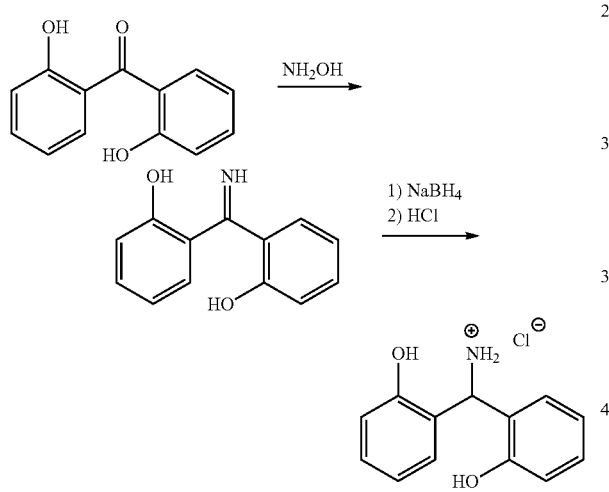

Example 2

This example describes the synthesis of a salicylaldehyde used in the synthesis of a ligand for a metal complex. Suitable methods of performing this reaction are also disclosed in U.S. Pat. No. 6,870,004 which is incorporated herein by reference.

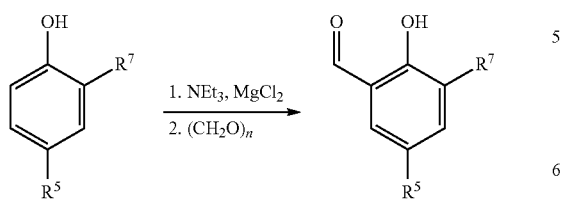

Example 3

This example describes the synthesis of metal complex A. A salicylaldehyde and an aminodiphenylmethane are reacted to yield ligand A-1. This ligand is reacted further with tin(IV) chloride to yield the metal complex.

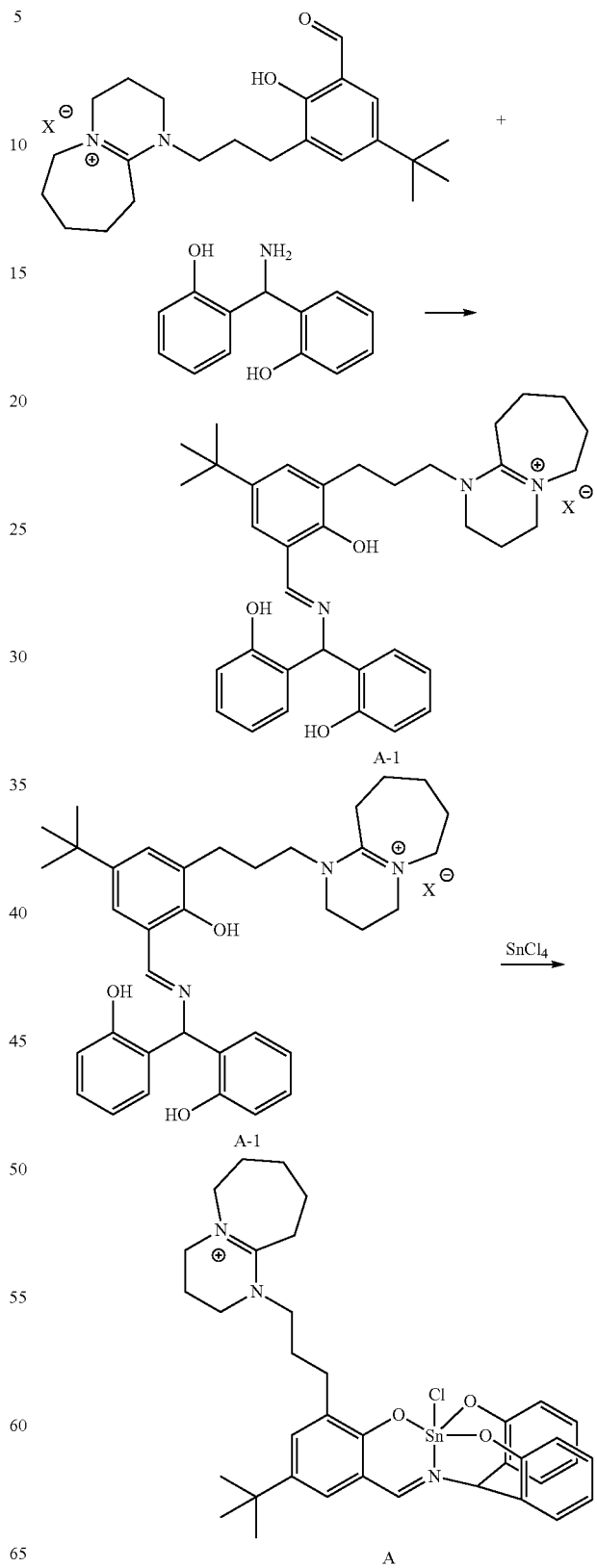

Example 4

This example describes the synthesis of metal complex B. An alkylated salicylaldehyde and an aminodiphenylmethane are reacted to yield ligand B-1. This ligand is reacted further with cobalt to yield the metal complex.

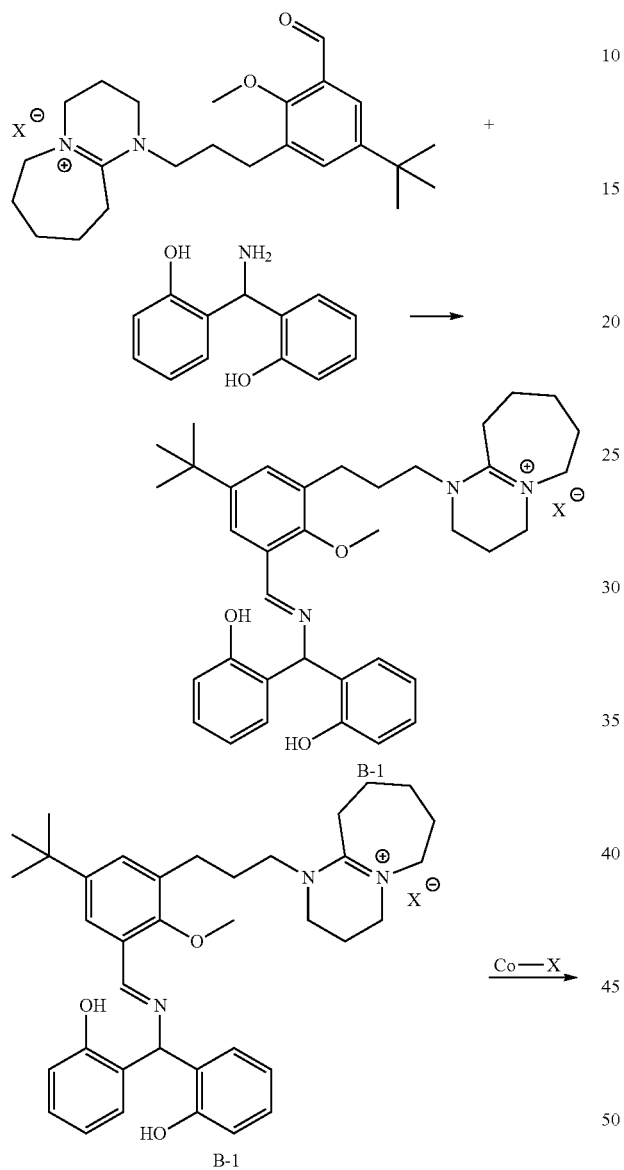

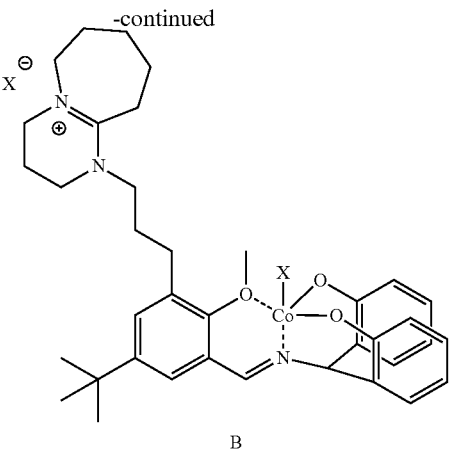

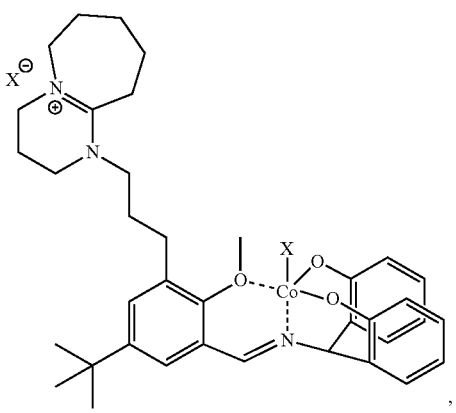

What is claimed is:

1. A metal complex wherein X is present and an anion.

2. The metal complex of claim 1, wherein X is a nucleophile capable of ring opening an epoxide.

3. The metal complex of claim 1, wherein X is selected from the group consisting of: acetate, trifluoroacetate, chloride, bromide, nitrate, carbonate, benzoate, and azide.

4. A method of catalyzing the reaction of an epoxide with carbon dioxide, comprising the step of contacting an epoxide with a metal complex of claim 1 in the presence of carbon dioxide.

* * * * *